(12) United States Patent
Yoon et al.

(10) Patent No.: US 11,611,086 B2
(45) Date of Patent: Mar. 21, 2023

(54) FUEL CELL STACK UNIT AND FUEL CELL STACK INCLUDING SAME

(71) Applicant: IUCF-HYU (INDUSTRY-UNIVERSITY COOPERATION FOUNDATION HANYANG UNIVERSITY), Seoul (KR)

(72) Inventors: Hee Sung Yoon, Pohang-si (KR); Ungyu Paik, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 487 days.

(21) Appl. No.: 16/395,727

(22) Filed: Apr. 26, 2019

(65) Prior Publication Data

US 2019/0252692 A1 Aug. 15, 2019

Related U.S. Application Data

(63) Continuation of application No. PCT/KR2017/011450, filed on Oct. 17, 2017.

(51) Int. Cl.
*H01M 8/0273* (2016.01)
*H01M 8/242* (2016.01)
(Continued)

(52) U.S. Cl.
CPC ......... *H01M 8/0273* (2013.01); *H01M 8/124* (2013.01); *H01M 8/242* (2013.01); *H01M 8/2485* (2013.01); *H01M 2008/1293* (2013.01)

(58) Field of Classification Search
CPC .... H01M 8/0273; H01M 8/242; H01M 8/124; H01M 8/2485; H01M 2008/1293
See application file for complete search history.

(56) References Cited

U.S. PATENT DOCUMENTS

| 2004/0202907 | A1 | 10/2004 | Chapman et al. | |
| 2016/0072136 | A1* | 3/2016 | Kageyama | H01M 8/2465 429/463 |
| 2017/0229718 | A1* | 8/2017 | Taguchi | H01M 8/1004 |

FOREIGN PATENT DOCUMENTS

| JP | 06-196193 A | 7/1994 |
| JP | 2007-172874 A | 7/2007 |

(Continued)

OTHER PUBLICATIONS

International Search Report of PCT/KR2017/011450 dated Feb. 5, 2018 [PCT/ISA/210].

*Primary Examiner* — Milton I Cano
*Assistant Examiner* — Mary G Henshaw
(74) *Attorney, Agent, or Firm* — Sughrue Mion, PLLC

(57) ABSTRACT

There may be provided a fuel cell stack unit comprising: a first gas separating plate; a first sealing gasket; a metal support, an end cell, and an air inlet being formed in the outer peripheral side of the center portion; a second sealing gasket; and a second gas separating plate stacked on the lower side of the second sealing gasket, wherein air introduced from the air inlet of the first gas separating plate successively passes through the air inlets formed in the first sealing gasket, the metal support, and the second sealing gasket, respectively, and flows from one side of the end cell to the other side thereof along a stacking boundary between the lower side of the end cell and the upper side of the second gas separating plate; and the second sealing gasket is recessed inward from an edge of the second sealing gasket.

6 Claims, 40 Drawing Sheets

(51) Int. Cl.
*H01M 8/2485* (2016.01)
*H01M 8/124* (2016.01)
*H01M 8/12* (2016.01)

(56) References Cited

FOREIGN PATENT DOCUMENTS

| | | |
|---|---|---|
| JP | 2013-257973 A | 12/2013 |
| KR | 10-2010-0020526 A | 2/2010 |
| KR | 10-2012-0012262 A | 2/2012 |
| KR | 10-2013-0080717 A | 7/2013 |
| KR | 10-2013-0083138 A | 7/2013 |
| WO | 2005/104287 A1 | 11/2005 |
| WO | 2015/174386 A1 | 11/2015 |

\* cited by examiner

【Fig. 1】
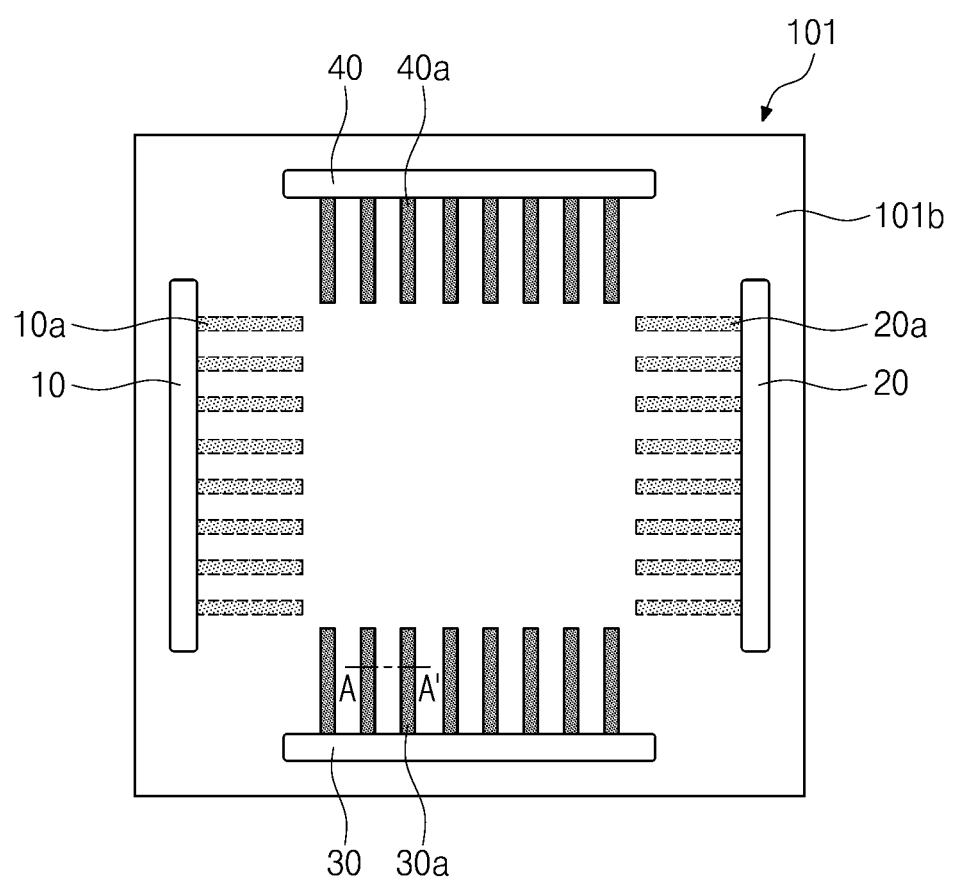

[Fig. 2]
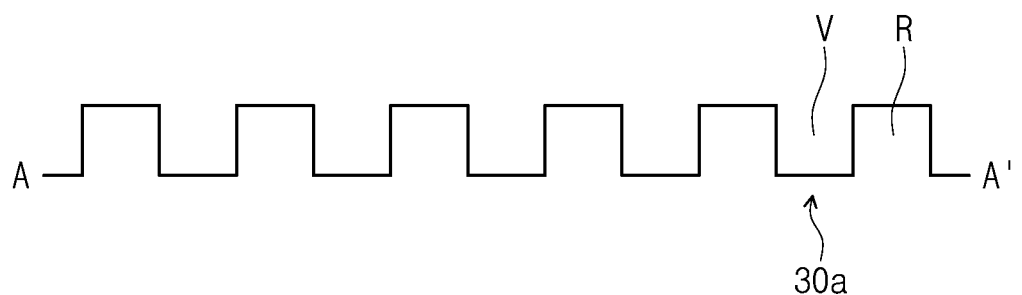

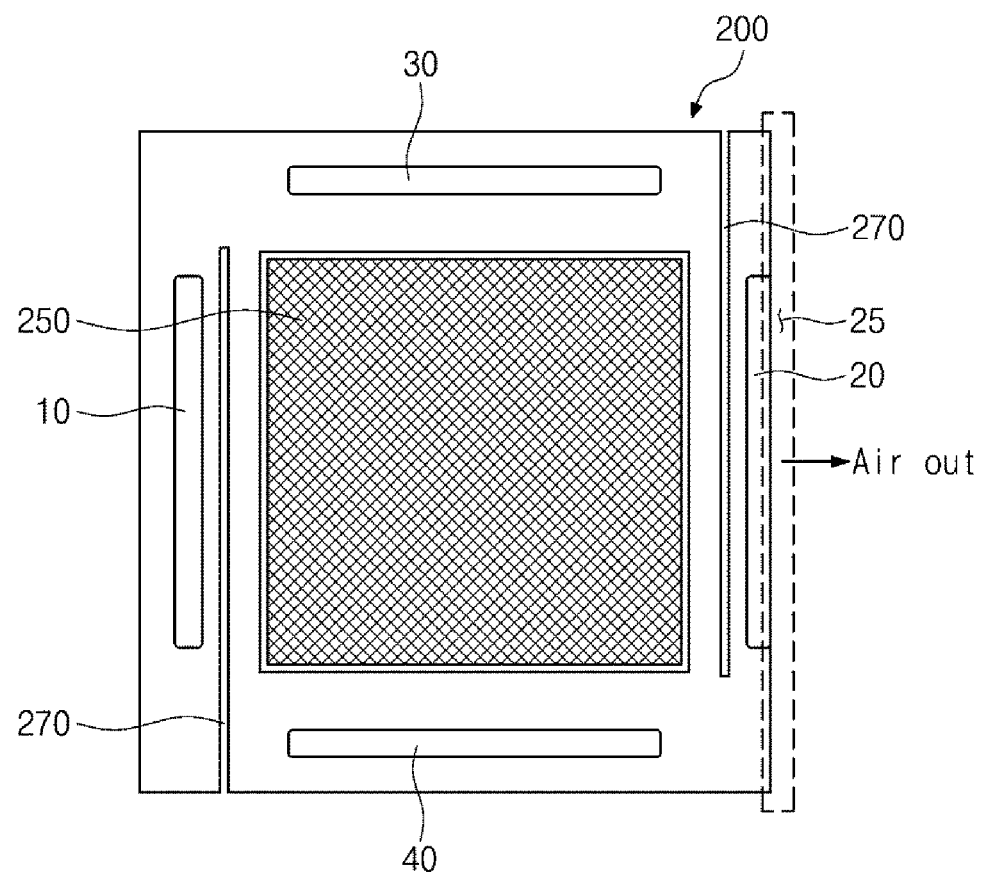
[Fig. 3]

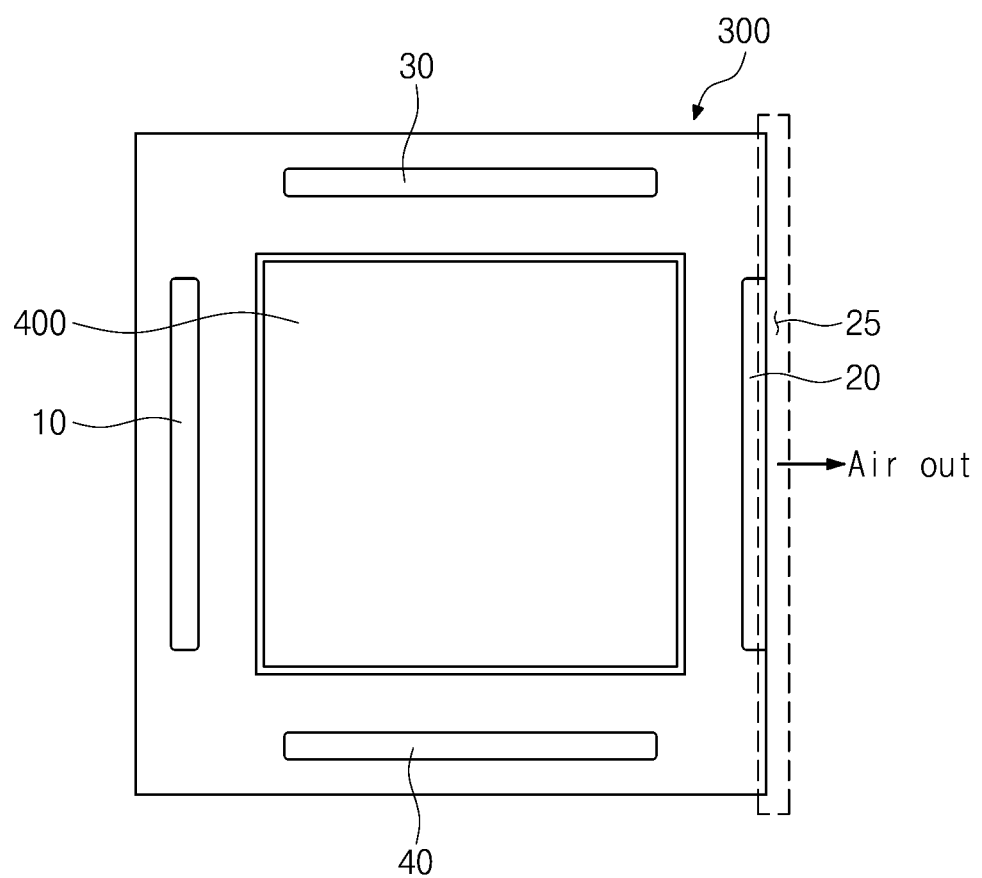
[Fig. 4]

[Fig. 5]
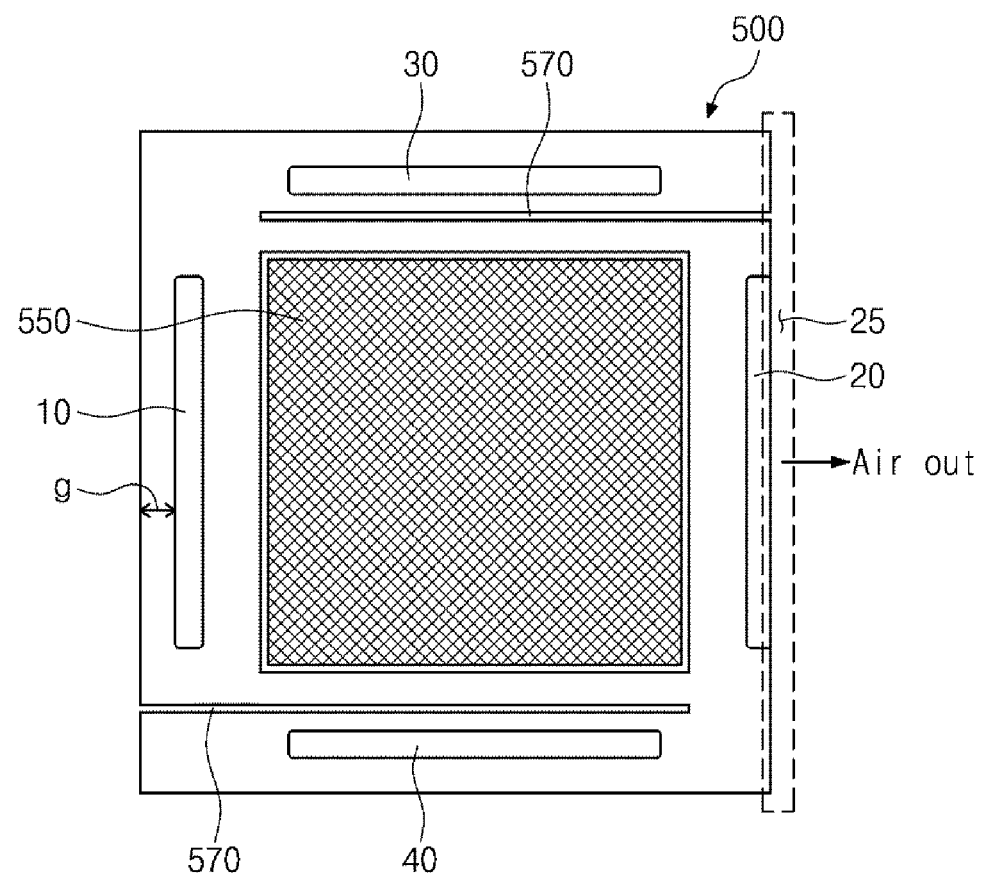

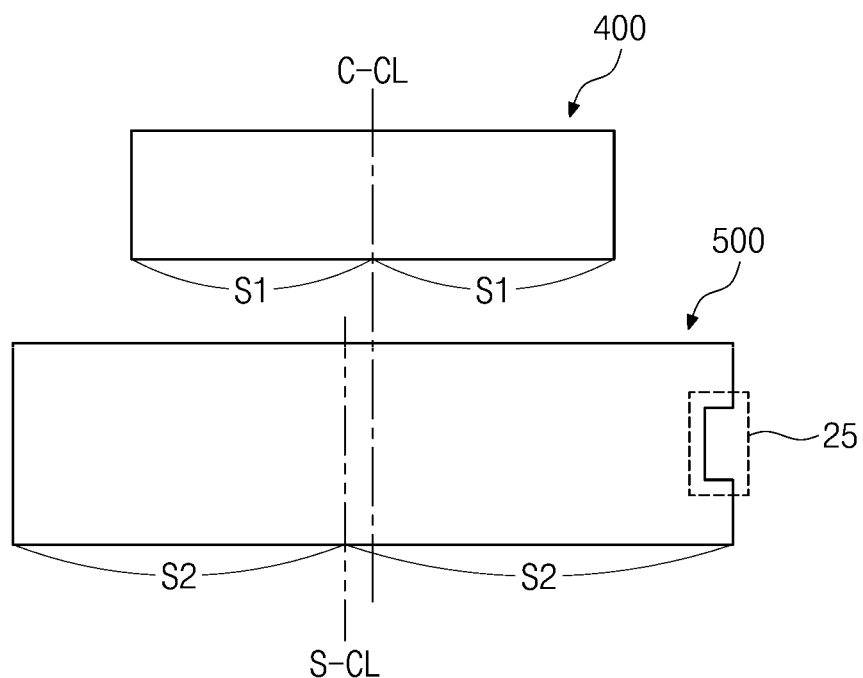
[Fig. 6]

[Fig. 7]
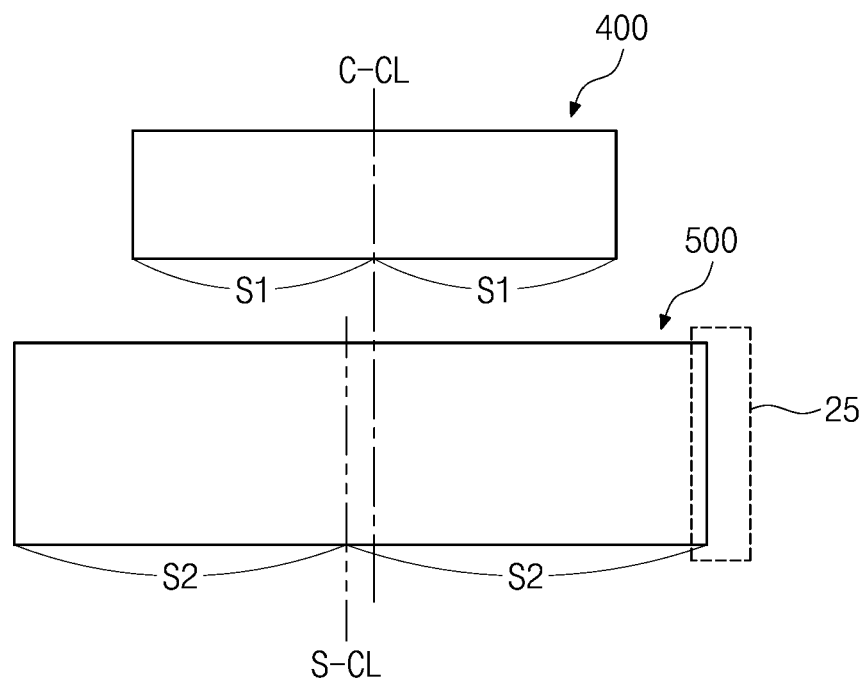

[Fig. 8]
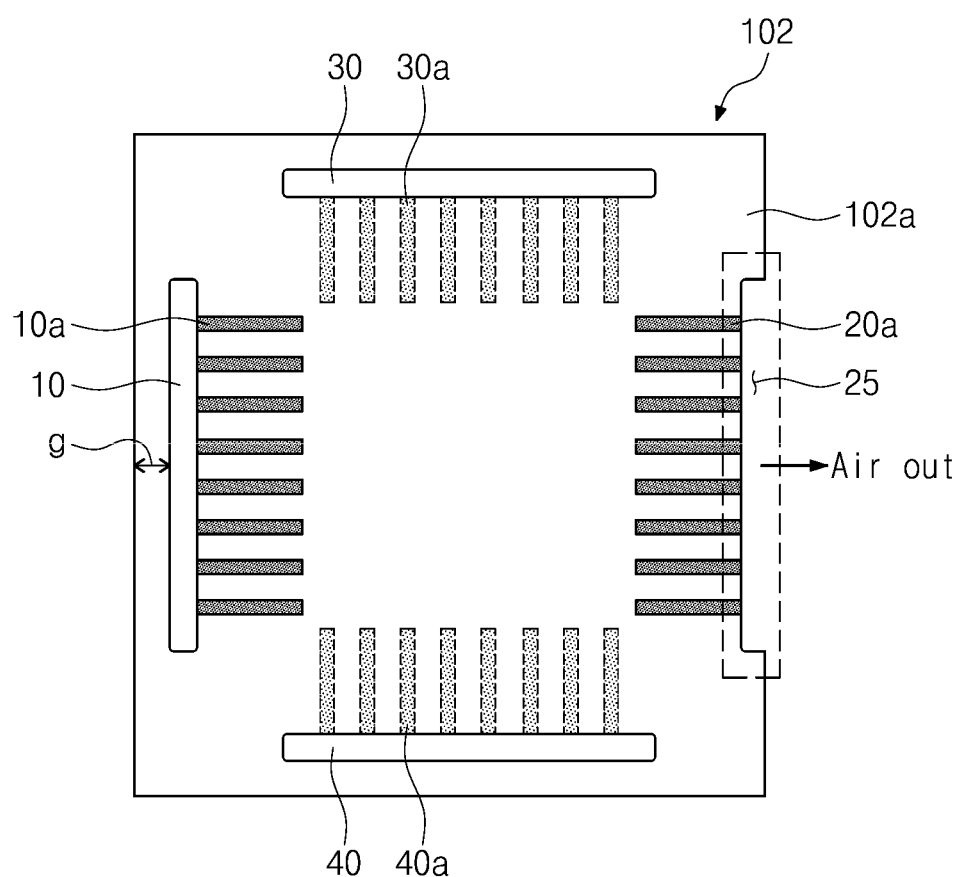

[Fig. 9]
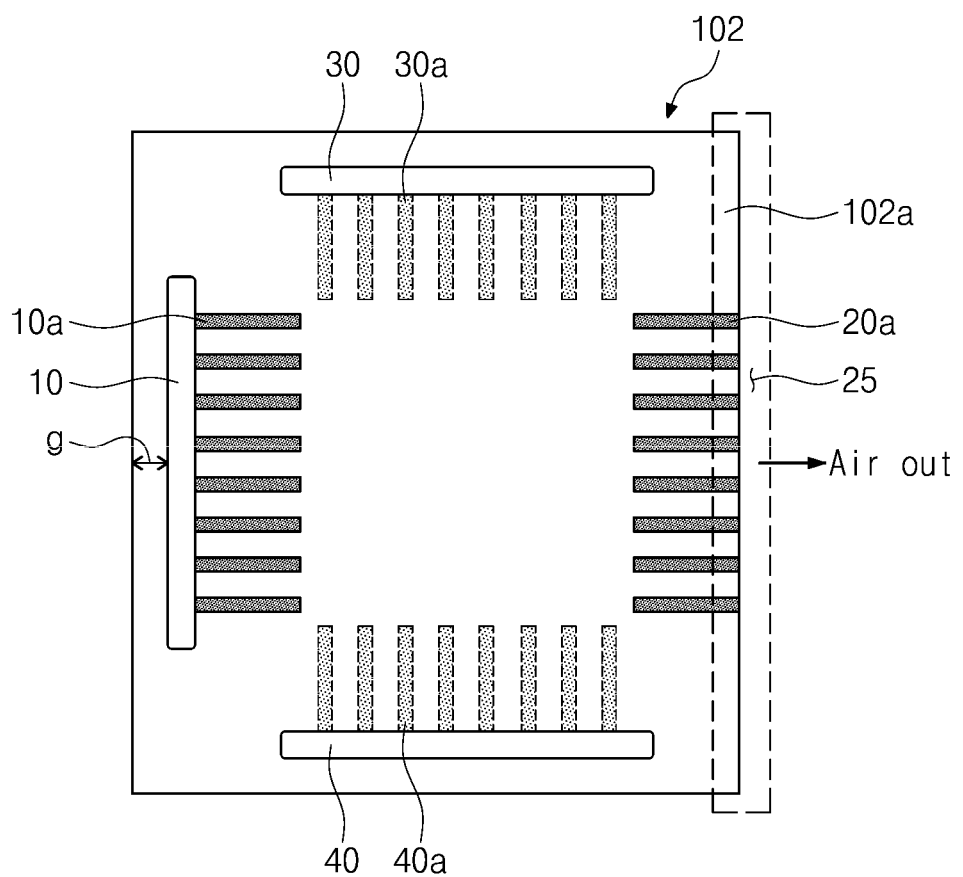

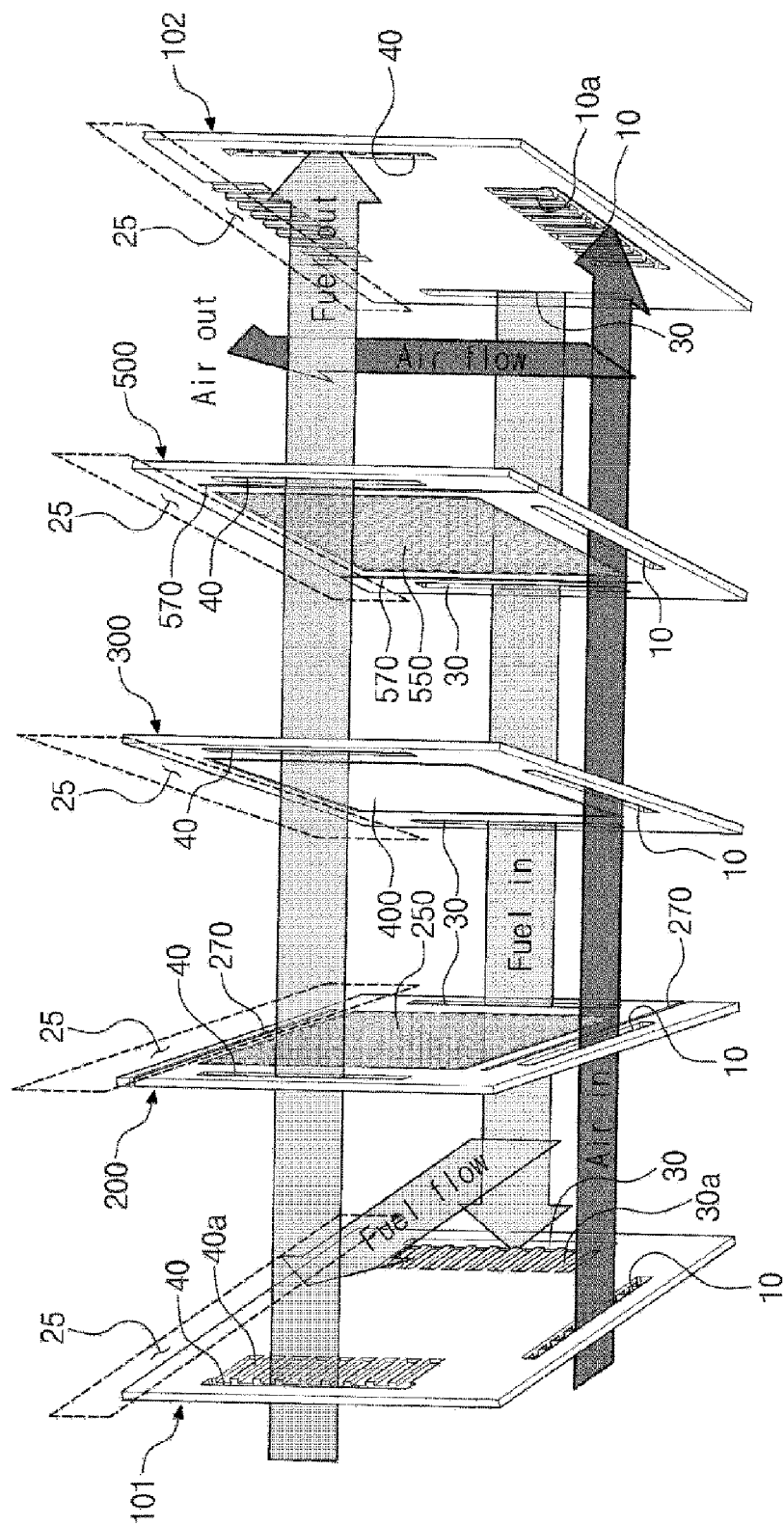
[Fig. 10]

[Fig. 11]
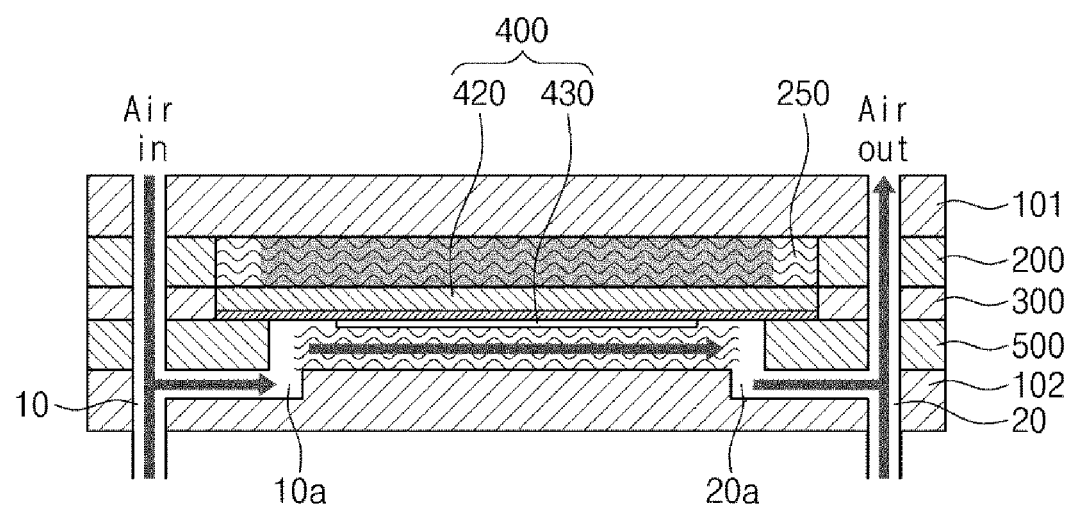

[Fig. 12]
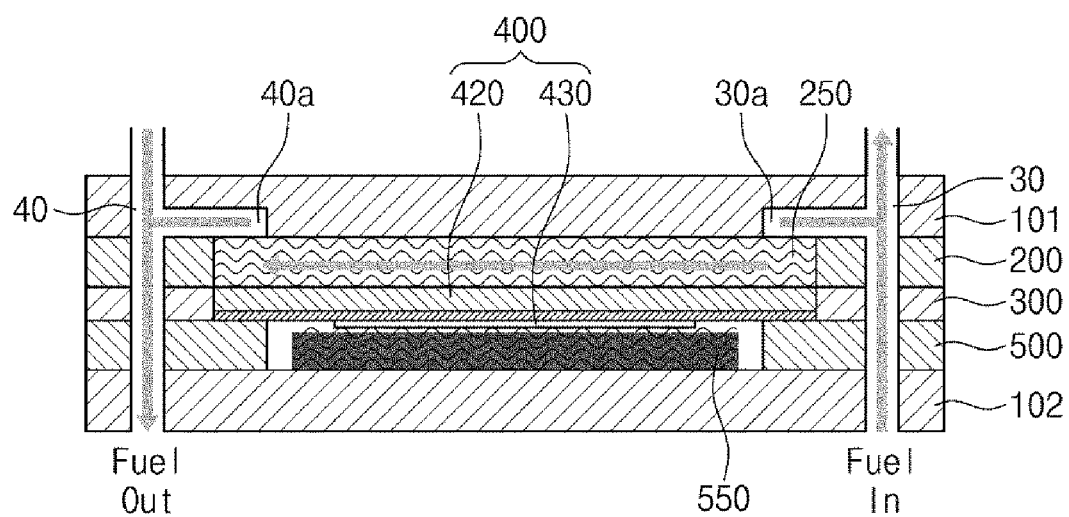

[Fig. 13]
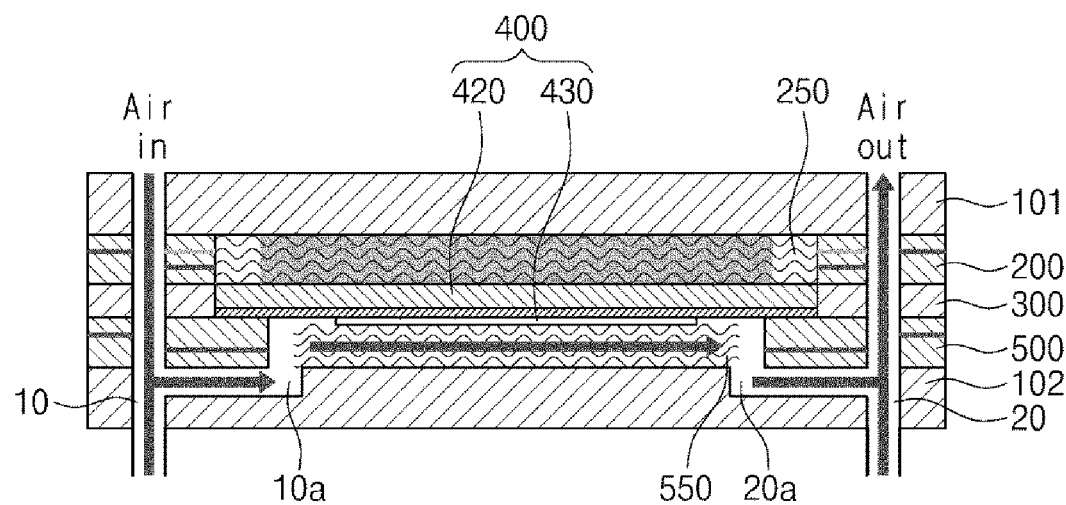

[Fig. 14]
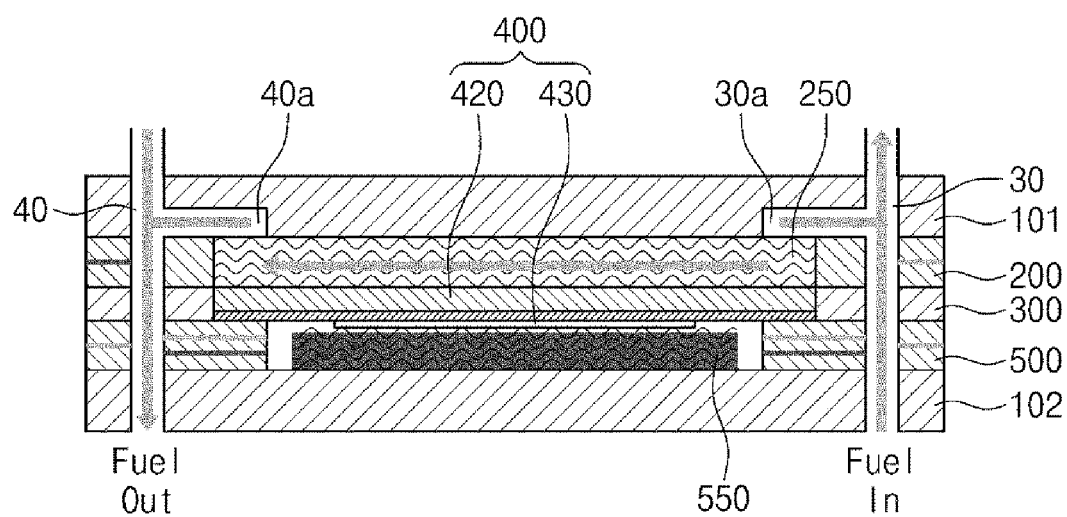

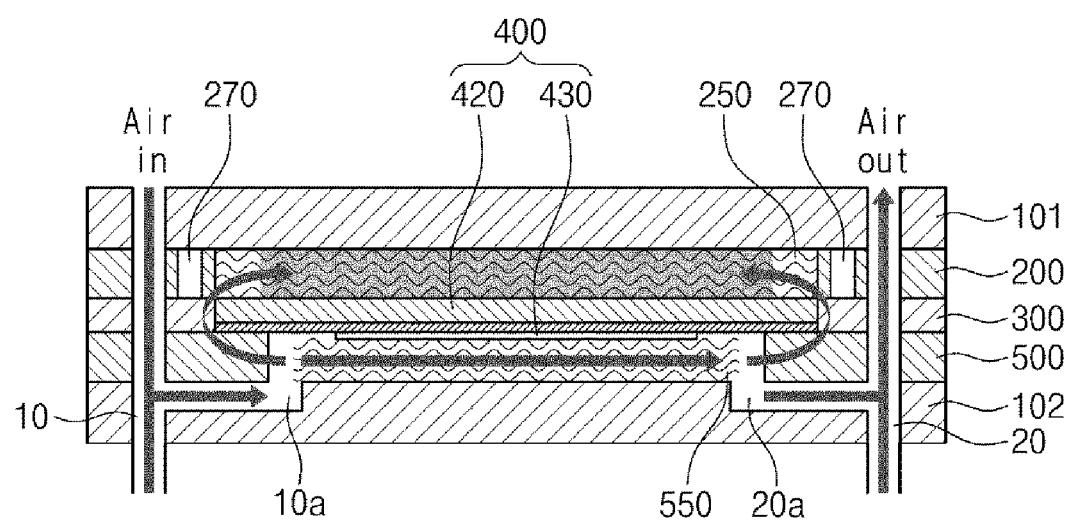
[Fig. 15]

[Fig. 16]
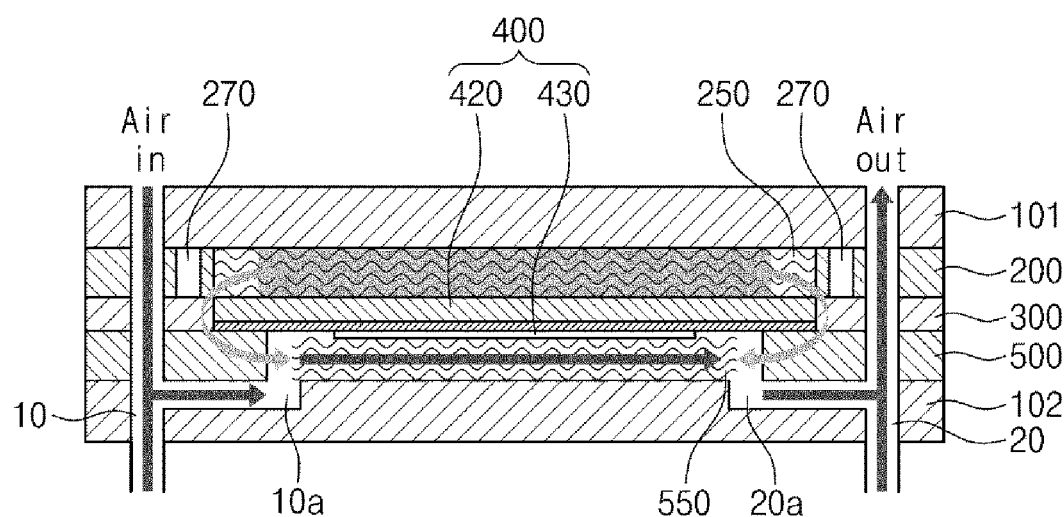

[Fig. 17]
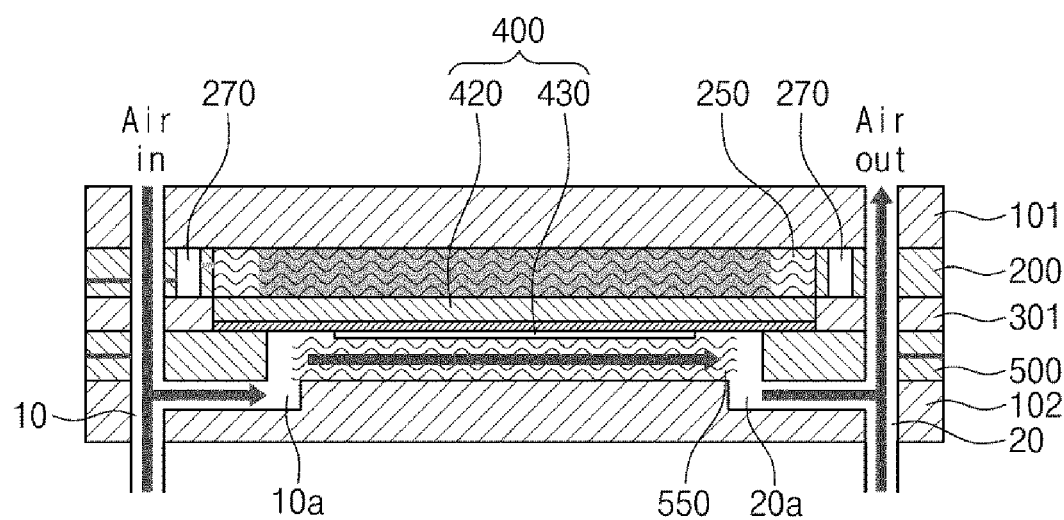

[Fig. 18]
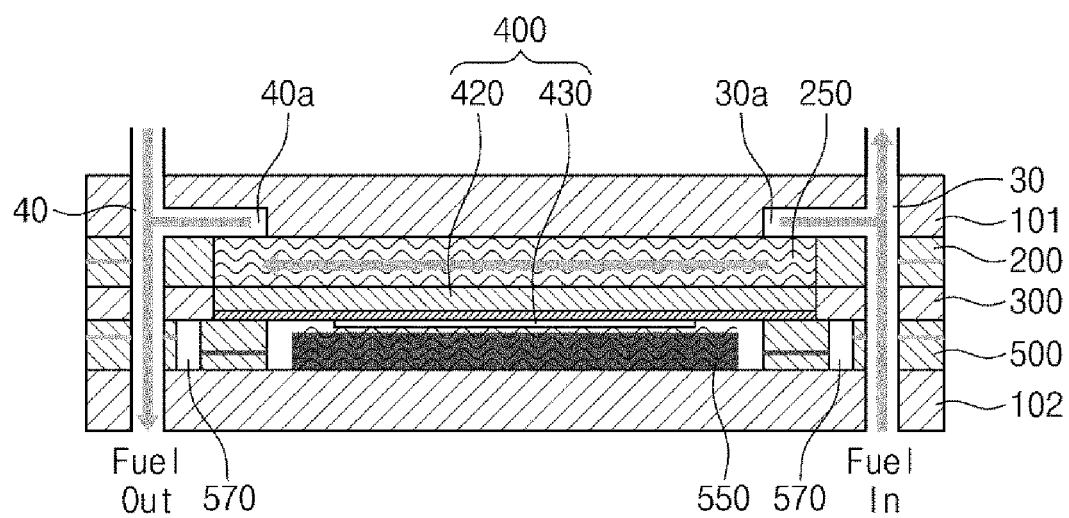

[Fig. 19]
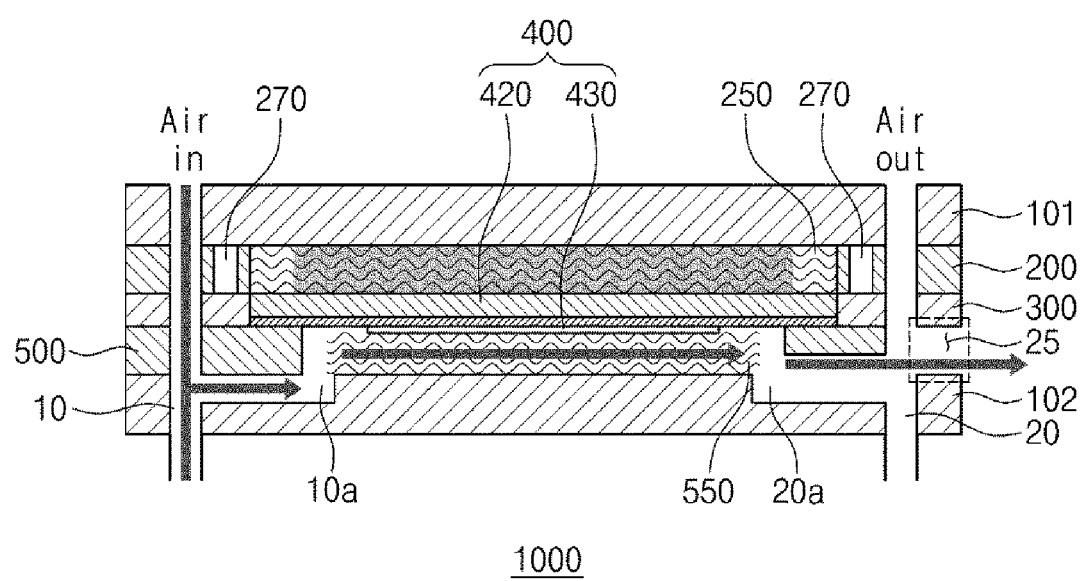

[Fig. 20]
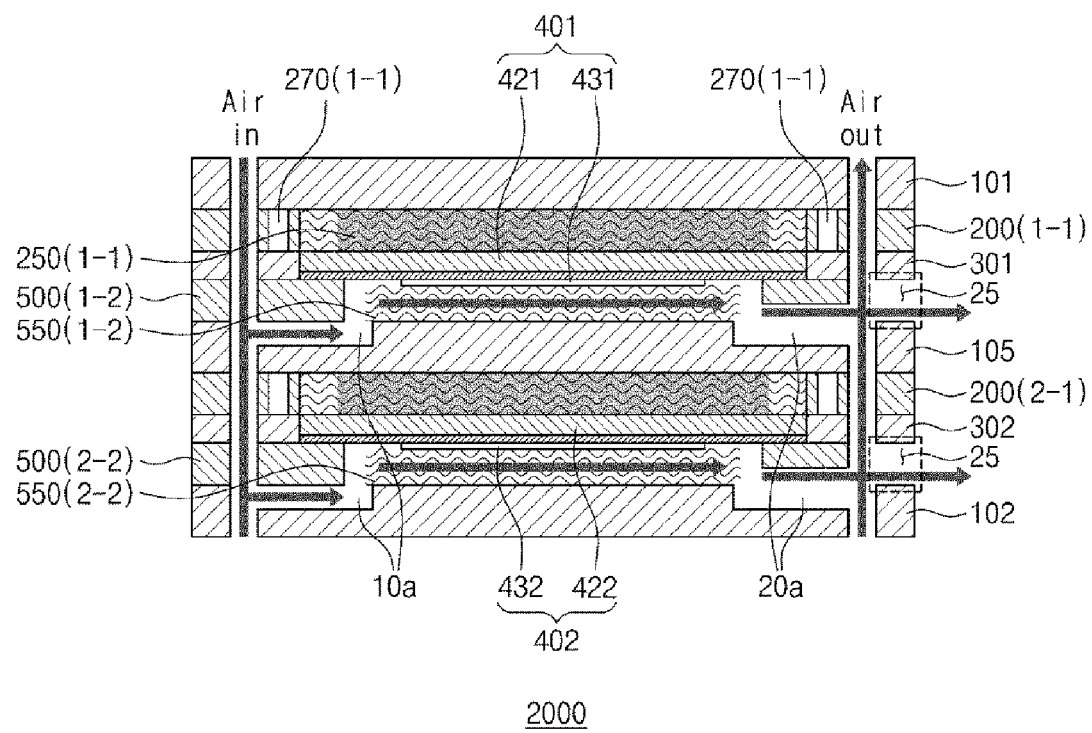

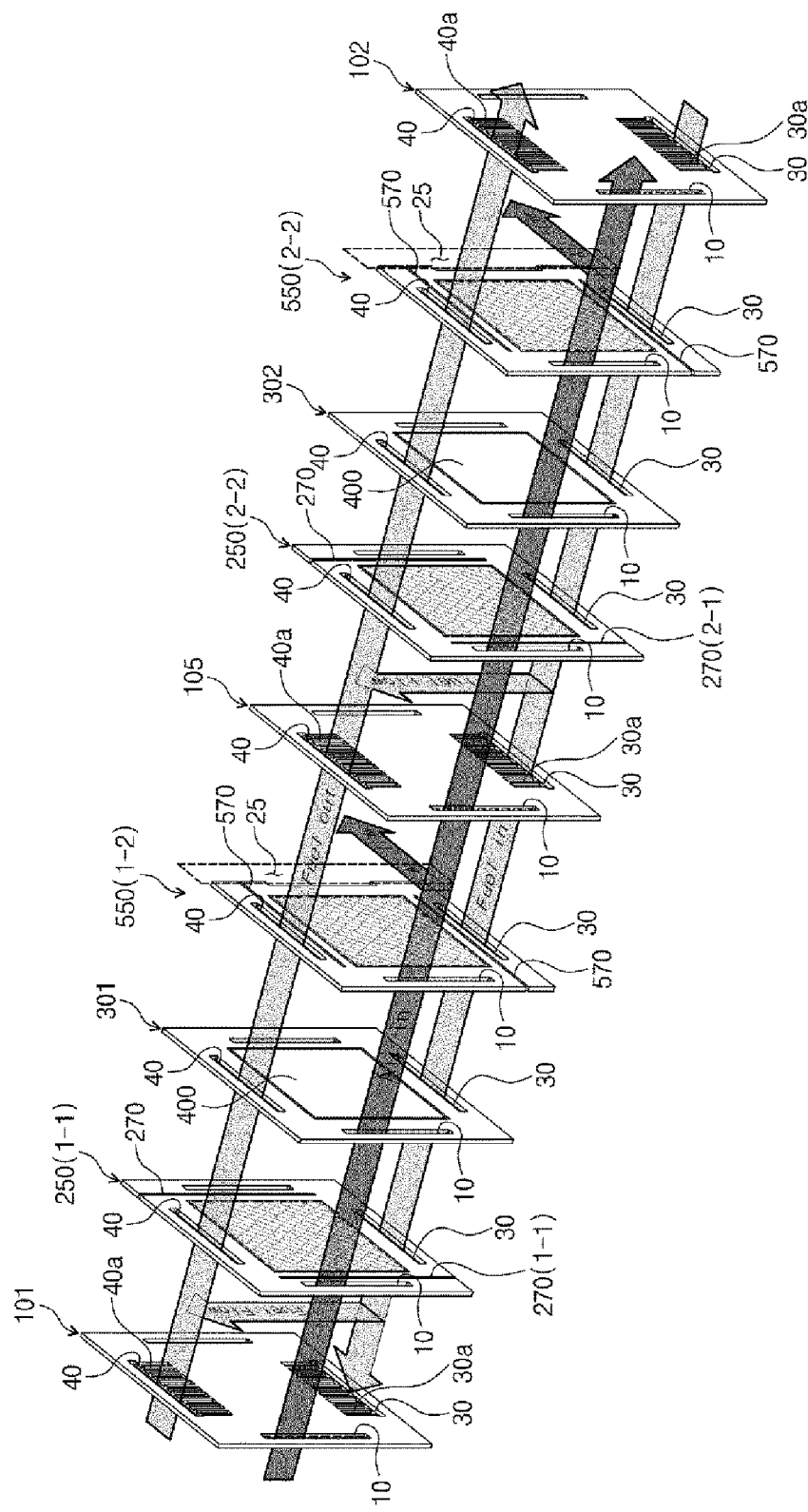
[Fig. 21]

[Fig. 22]
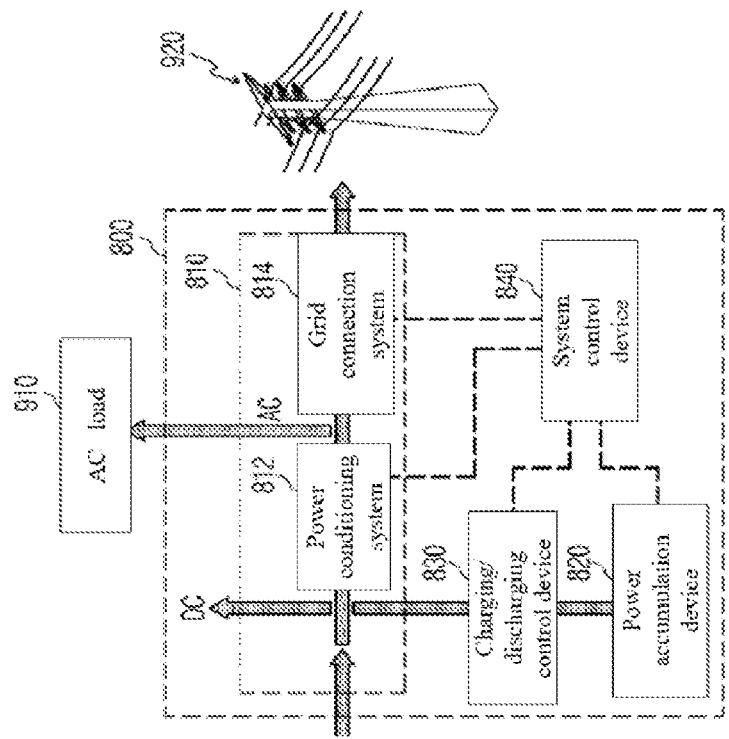
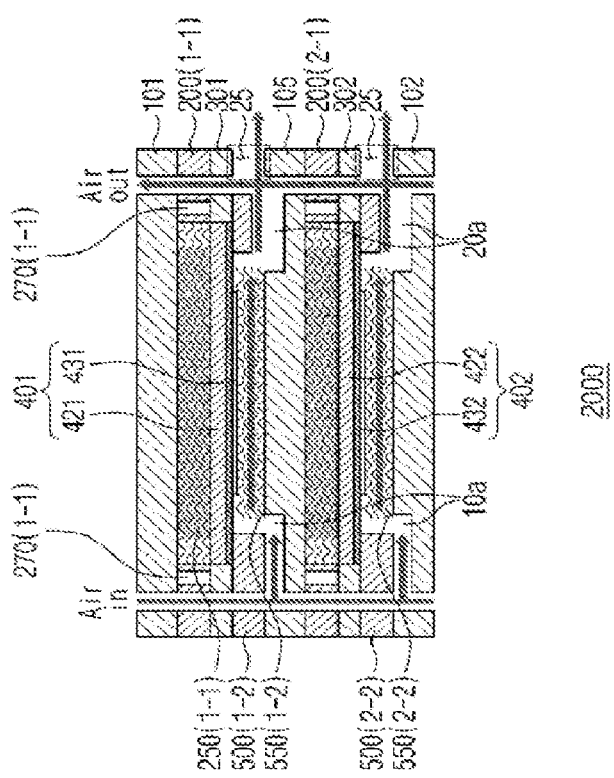

[Fig. 23]
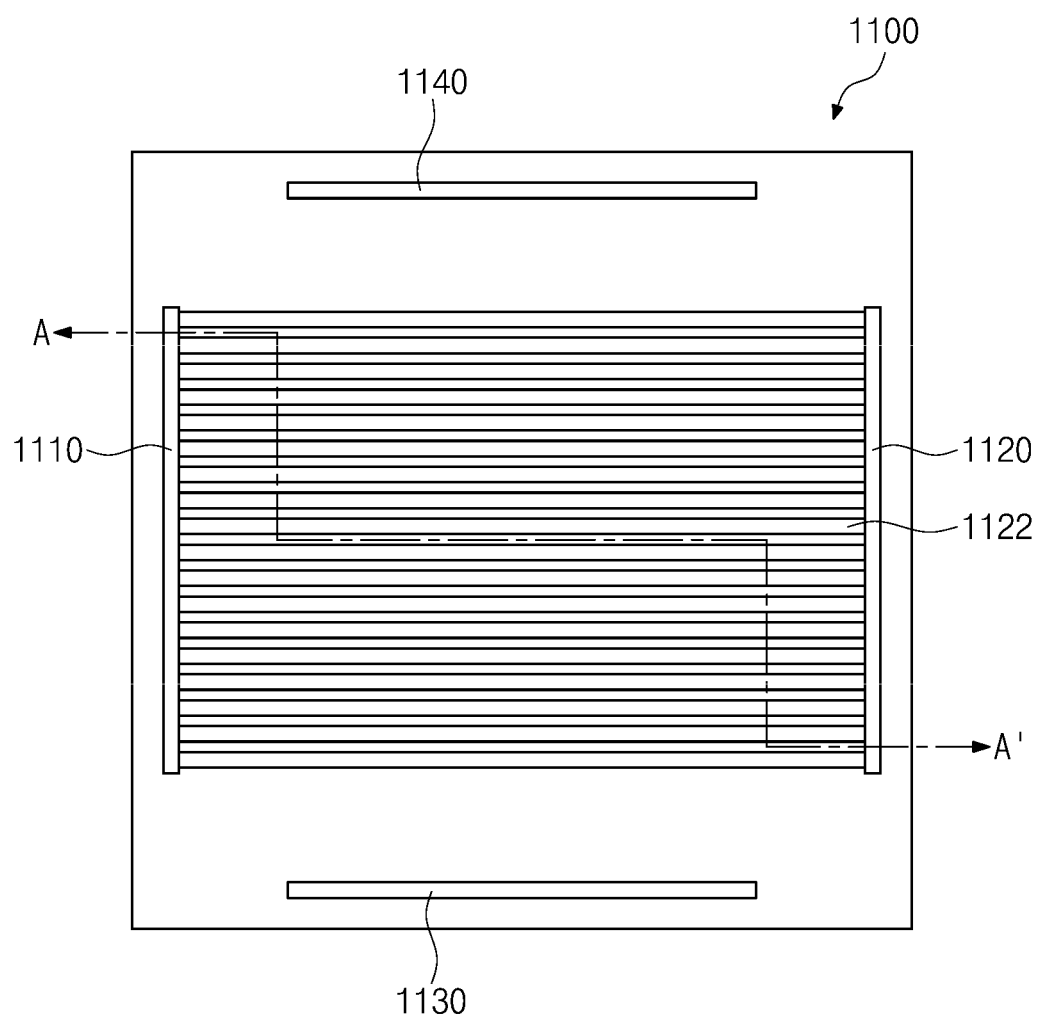

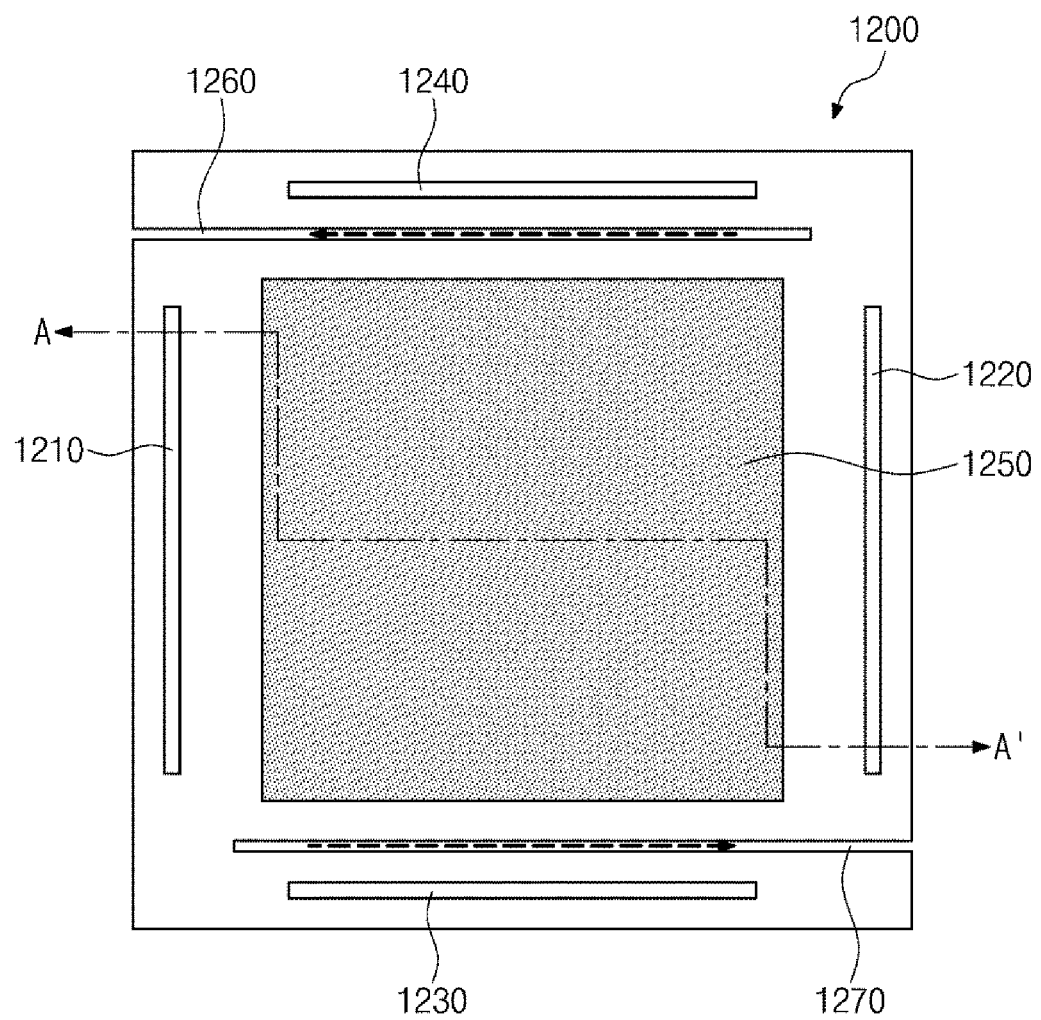
[Fig. 24]

[Fig. 25]
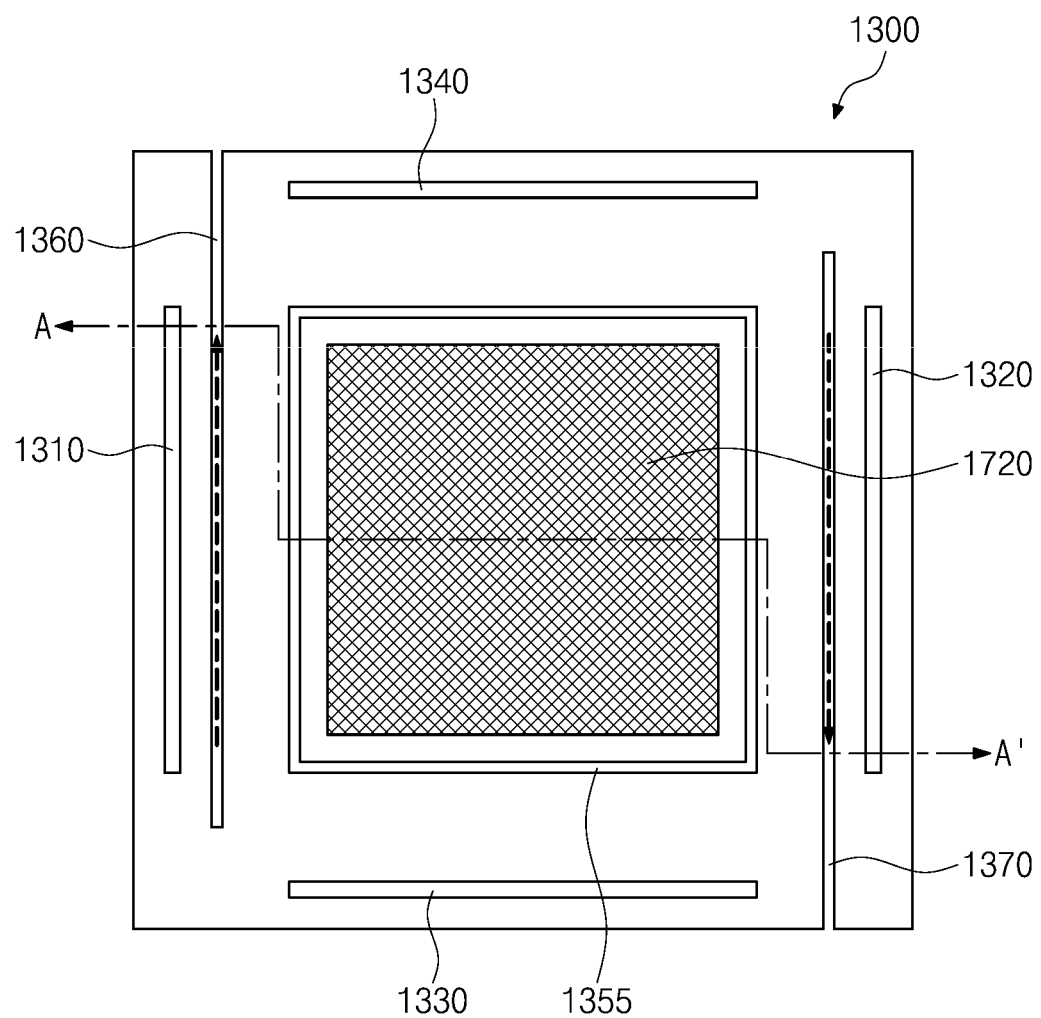

[Fig. 26]
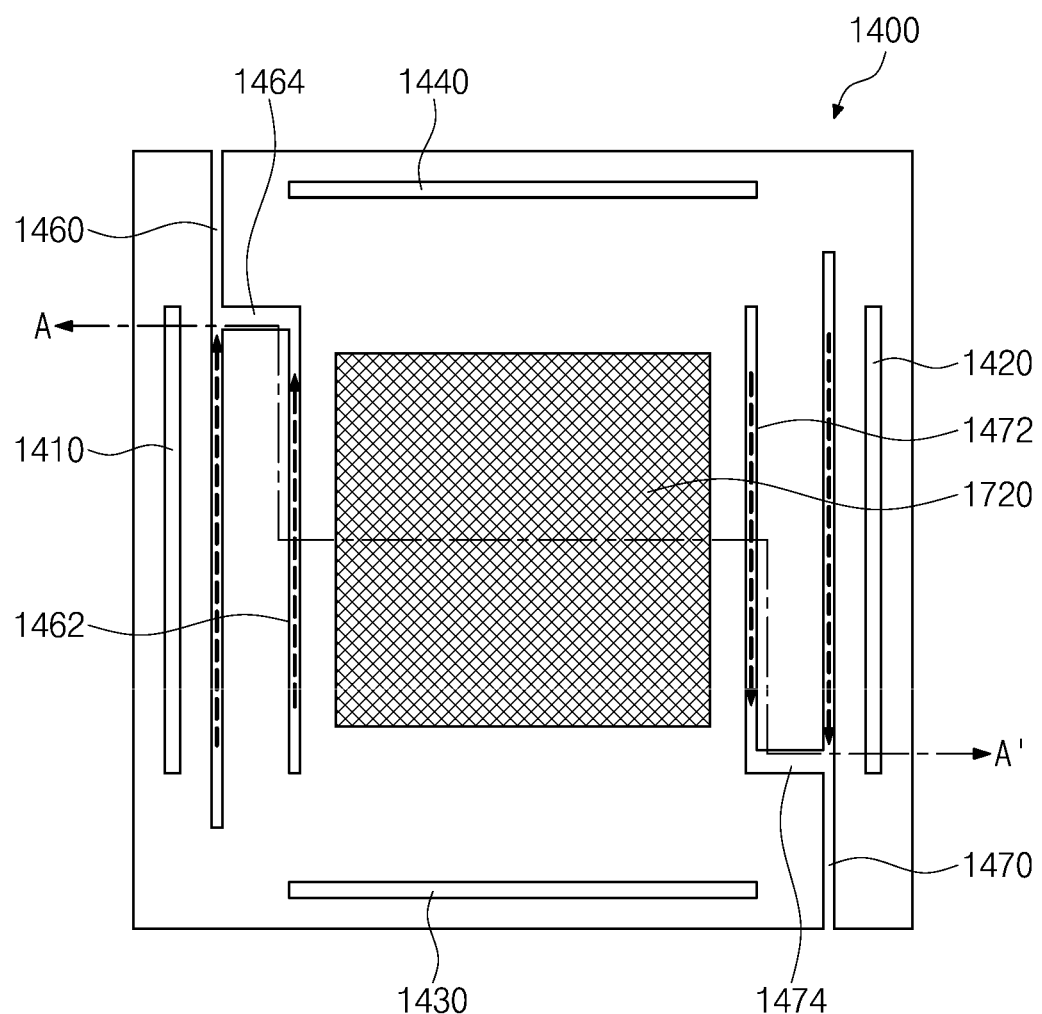

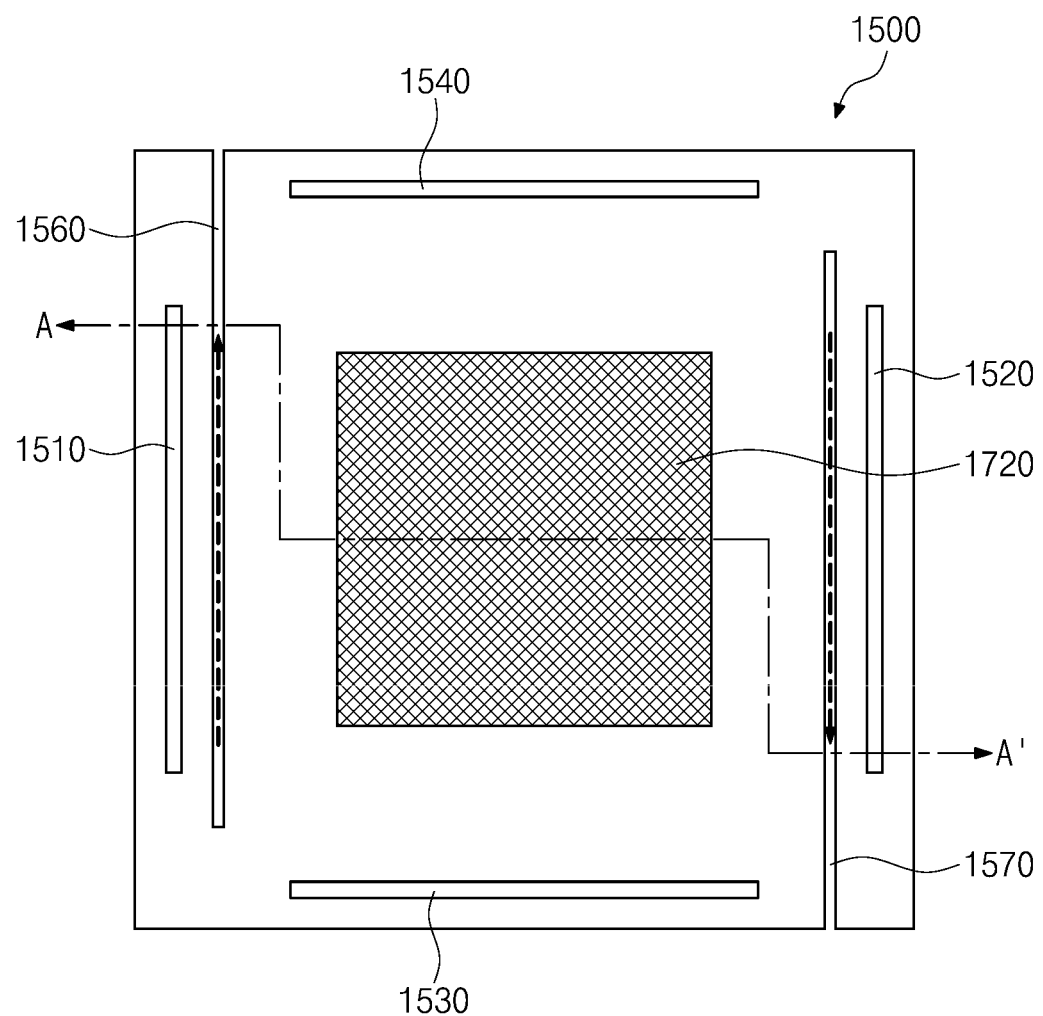
[Fig. 27]

[Fig. 28]
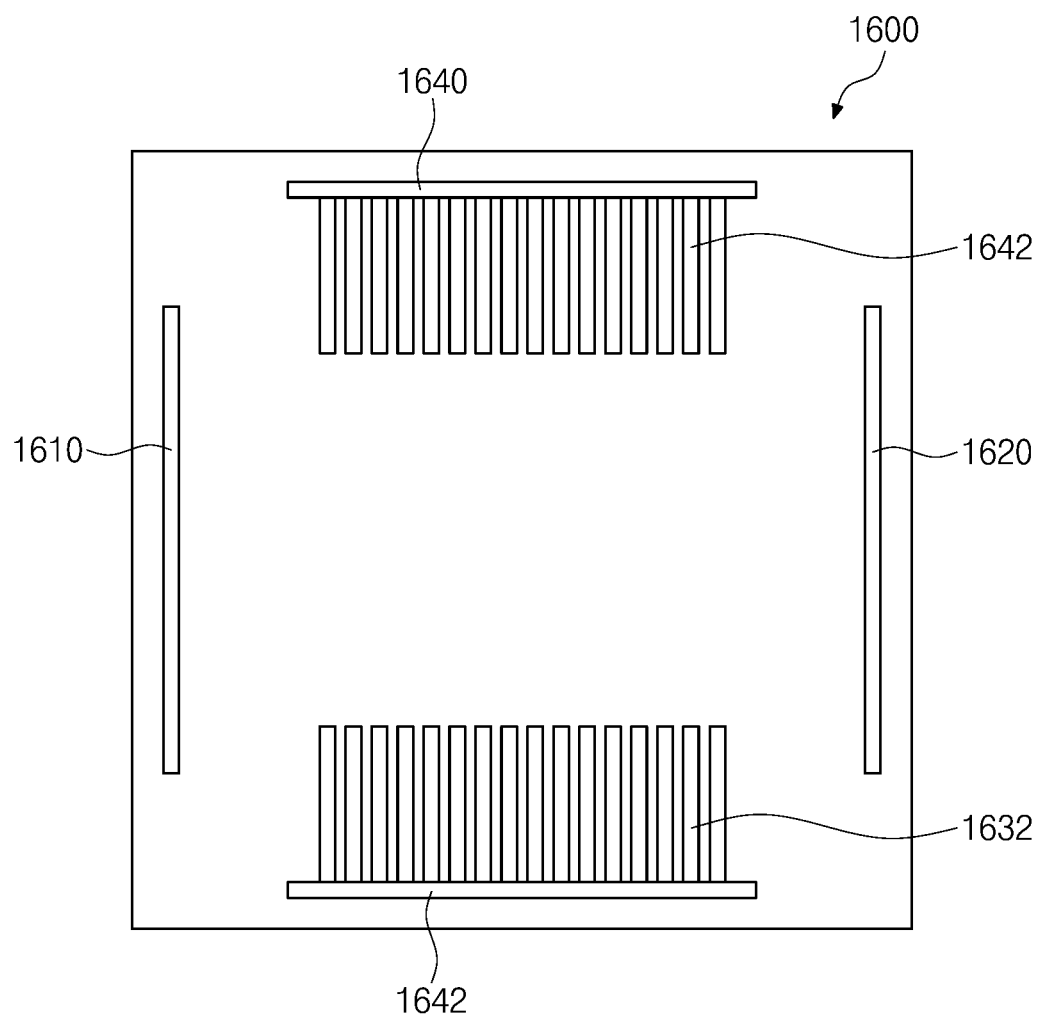

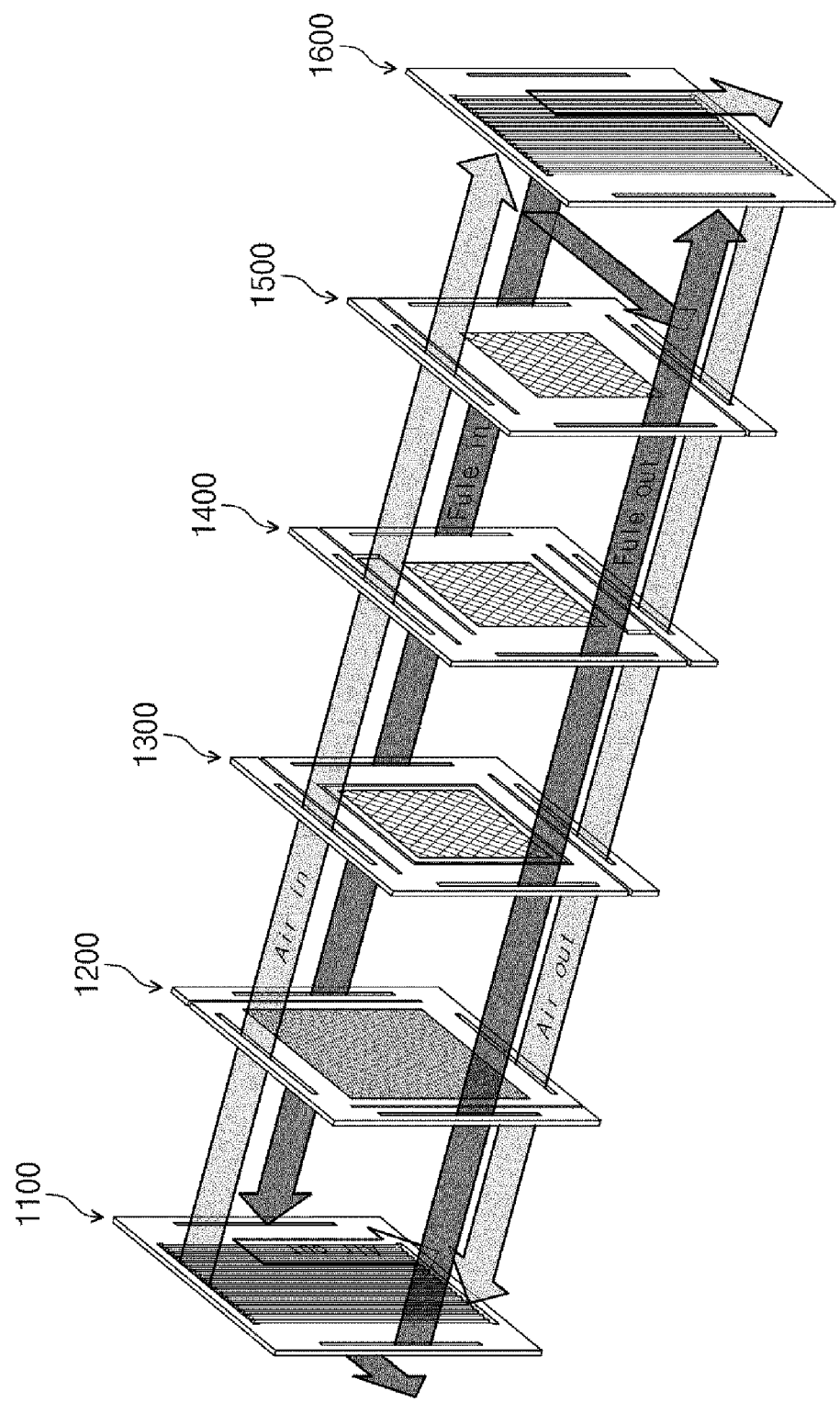
[Fig. 29]

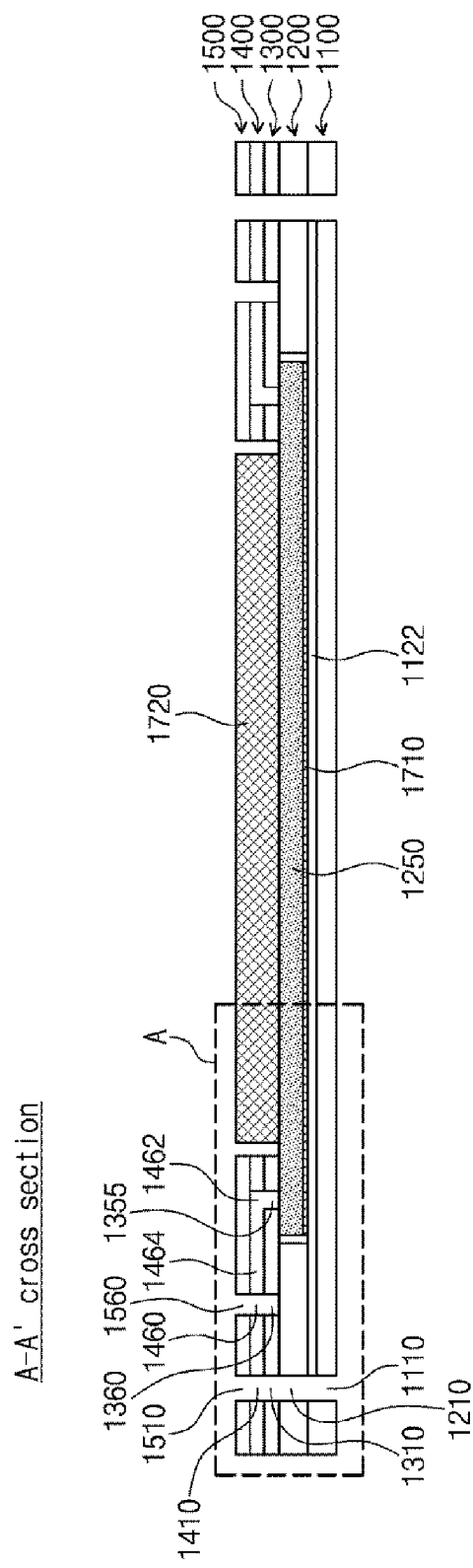
[Fig. 30]

[Fig. 31]
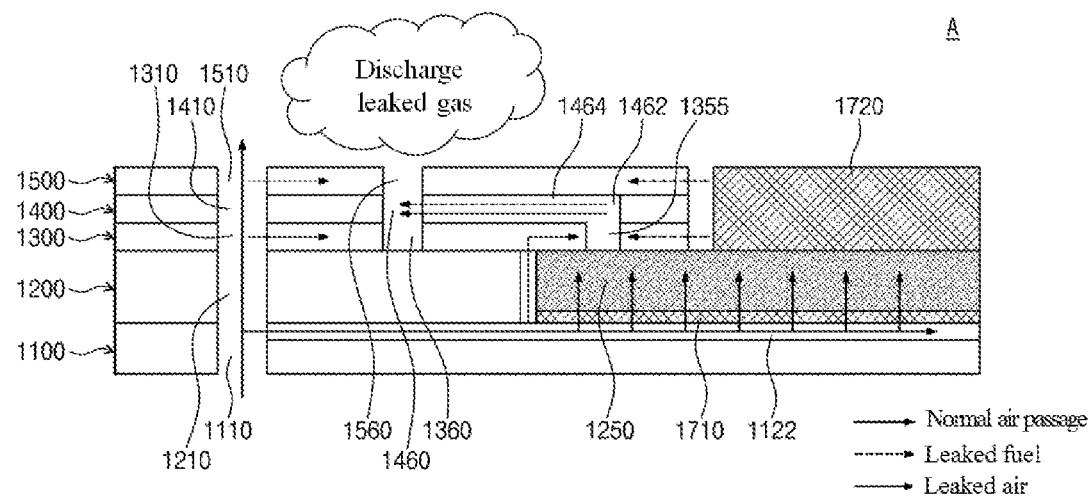

[Fig. 32]
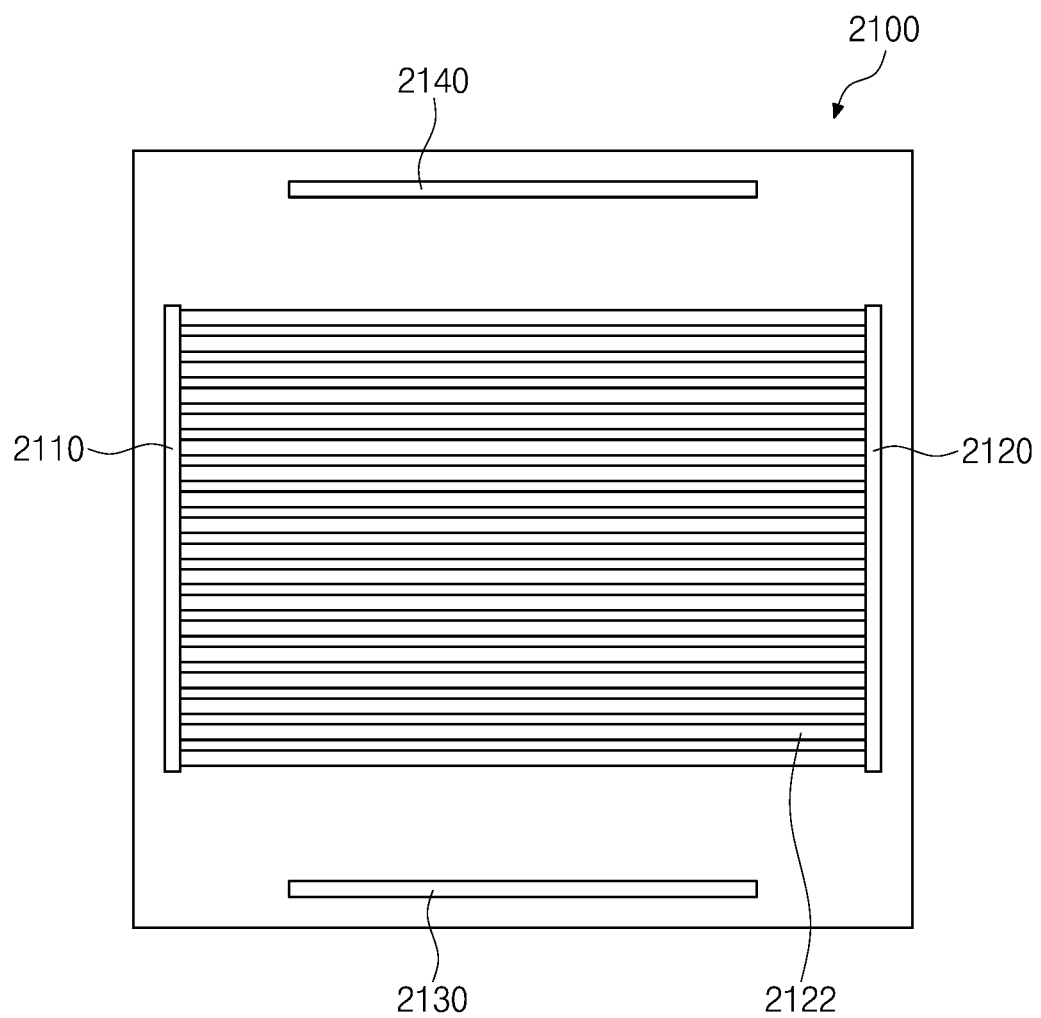

[Fig. 33]
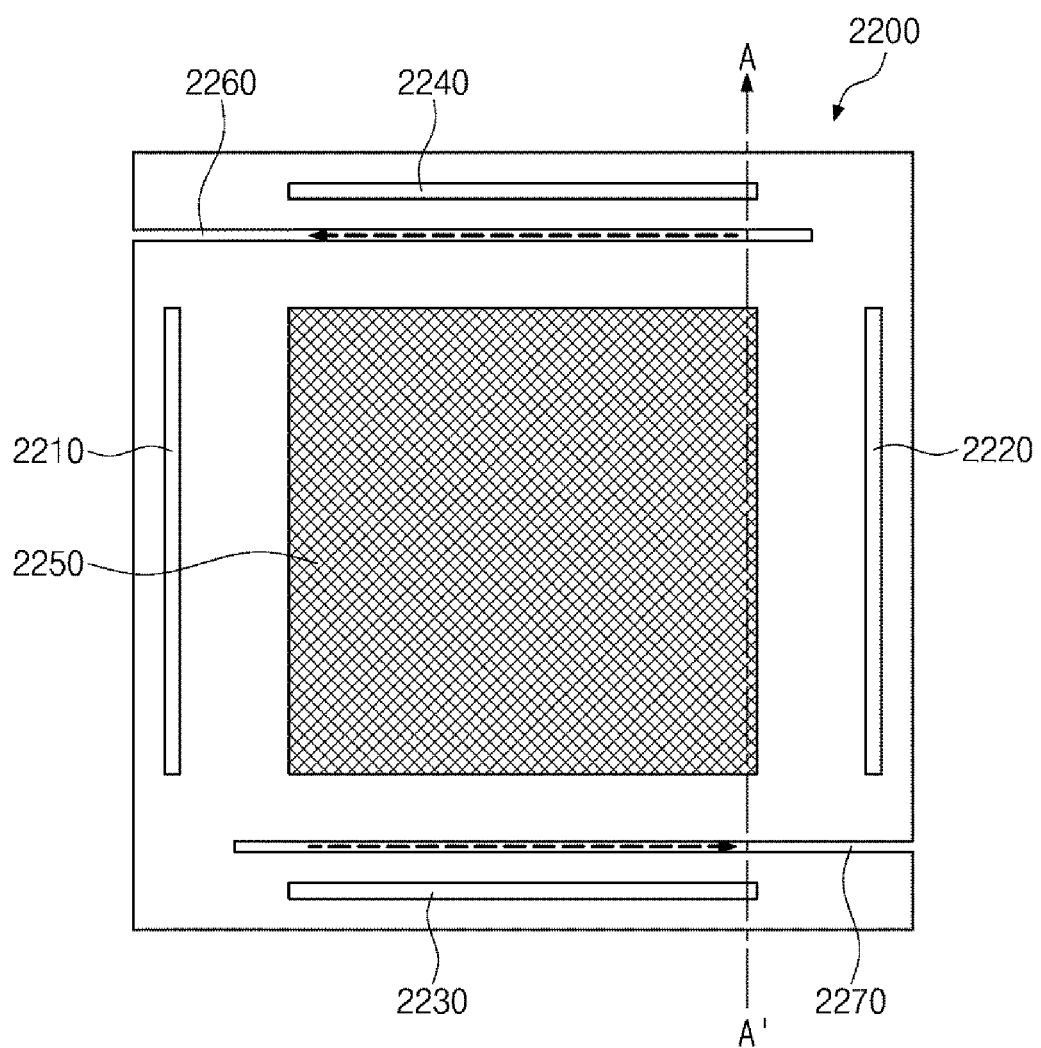

[Fig. 34]
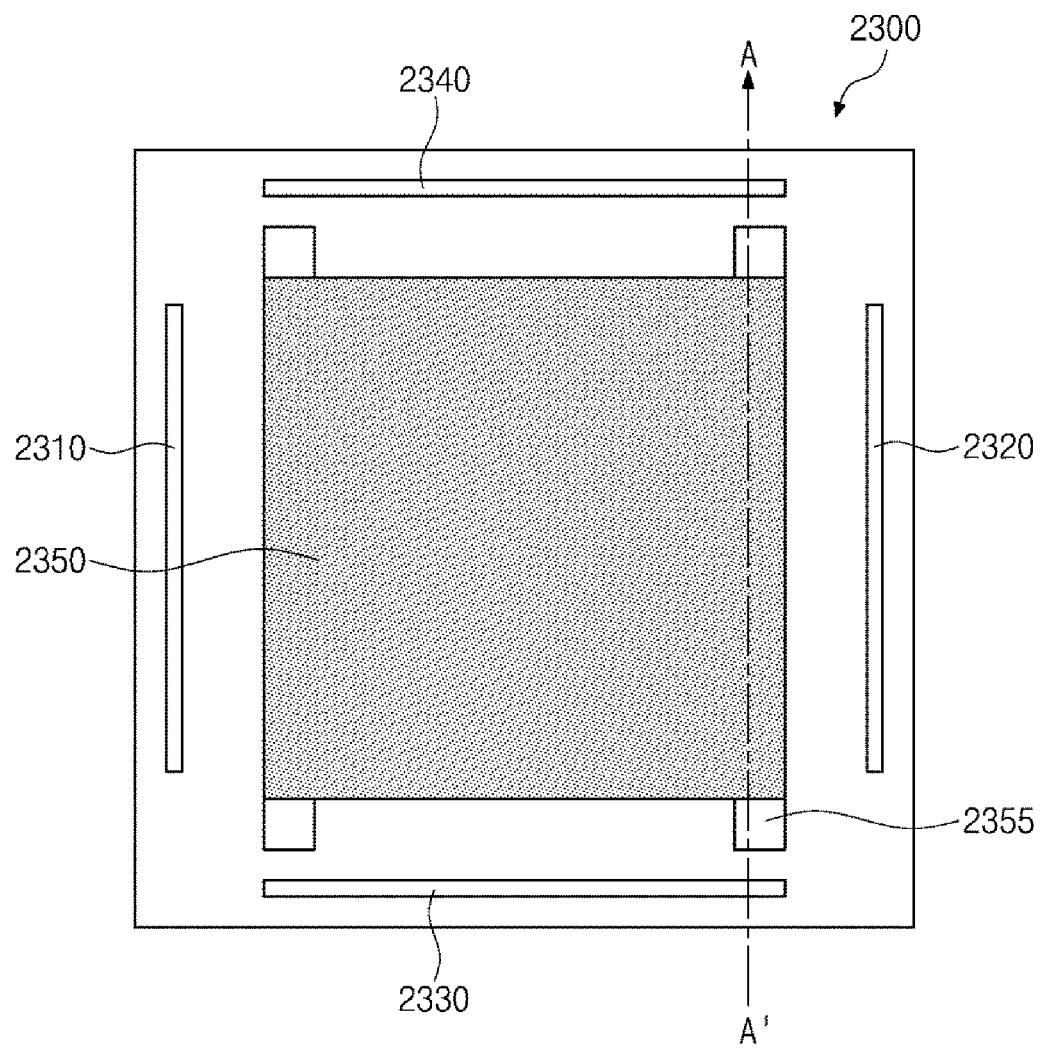

[Fig. 35]
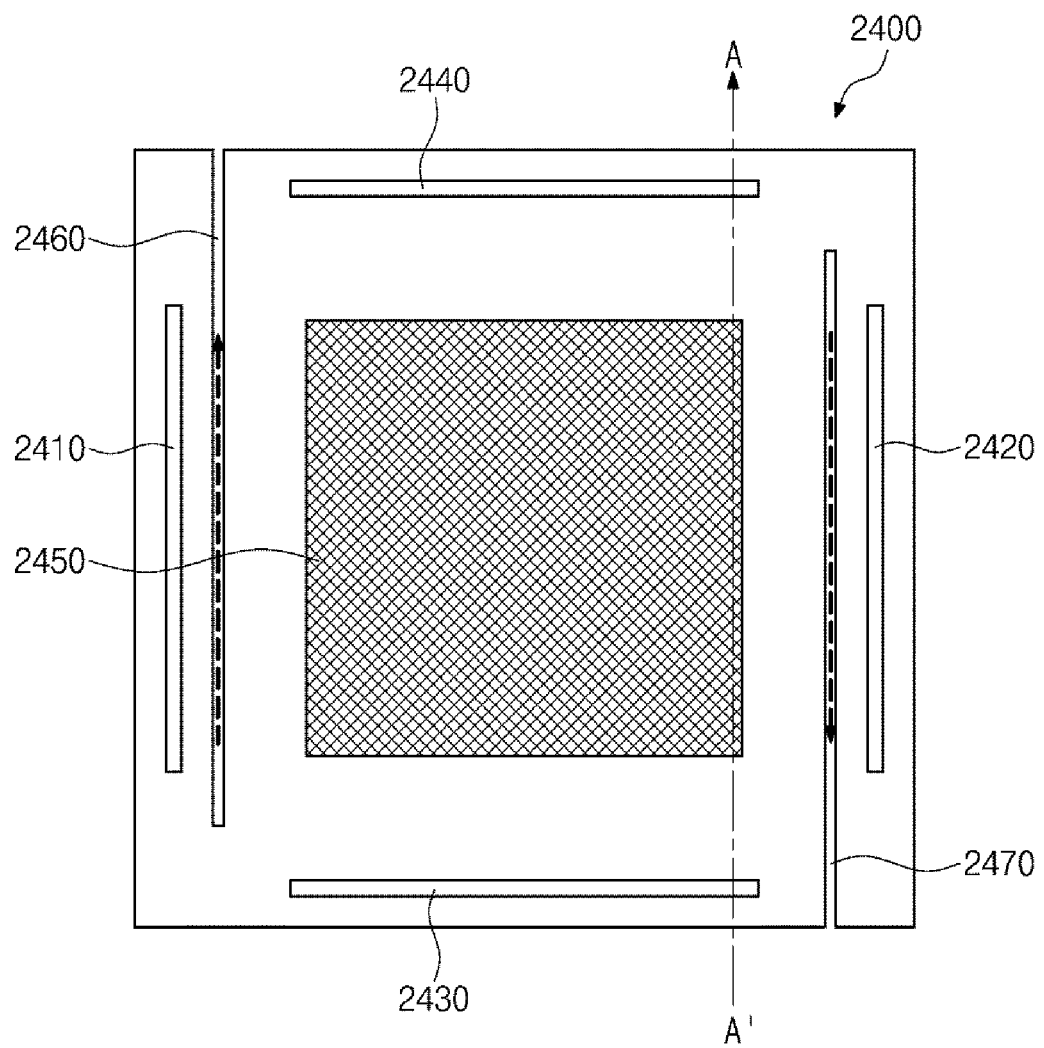

[Fig. 36]
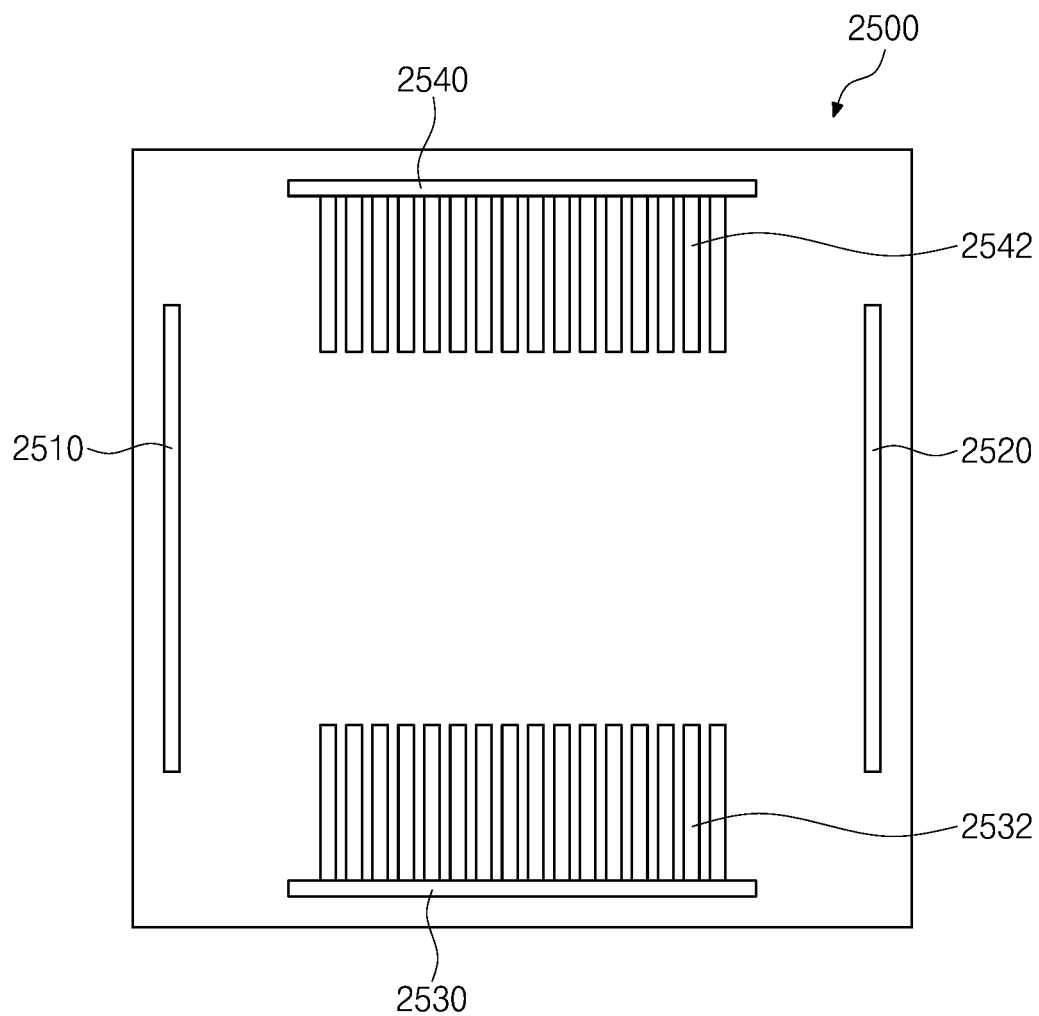

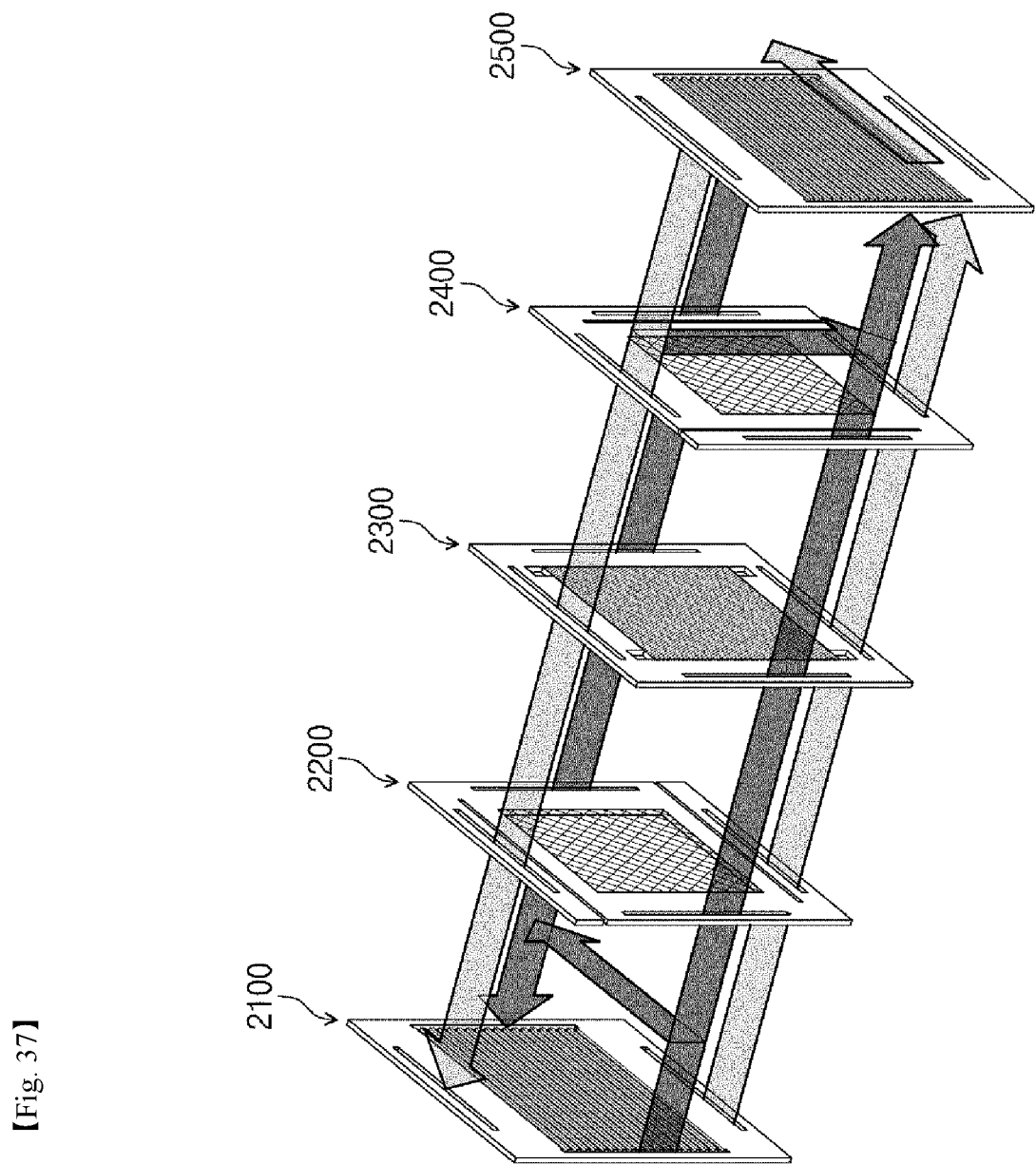
[Fig. 37]

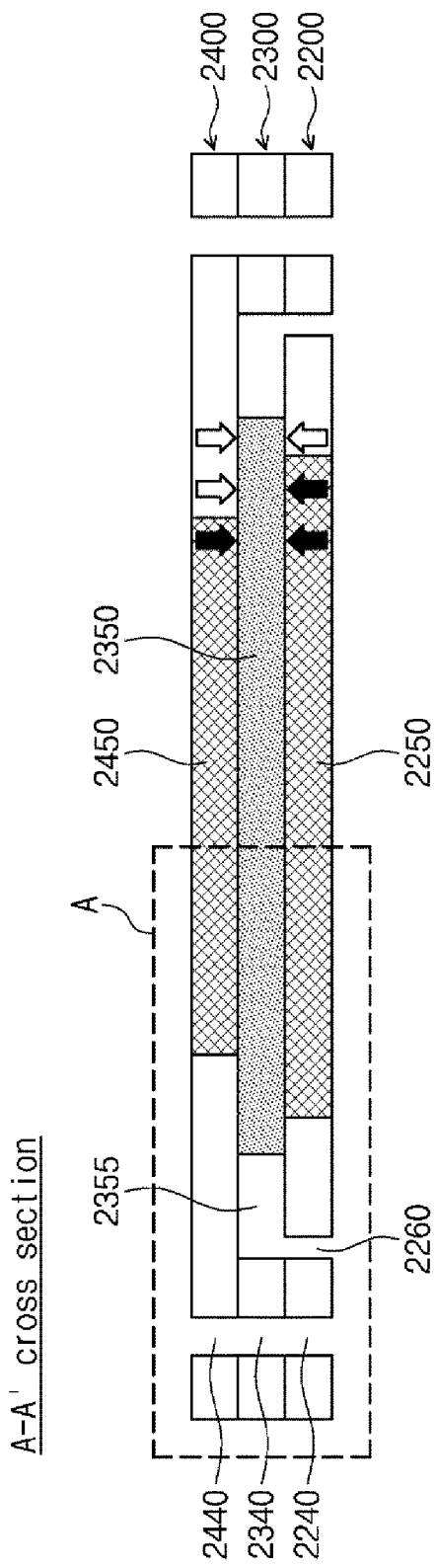

[Fig. 39]
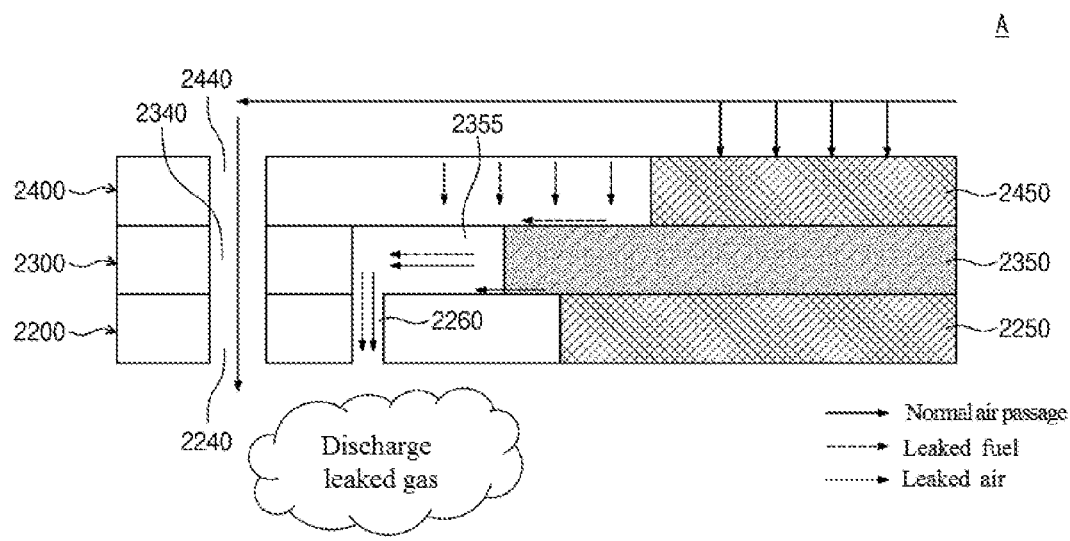

[Fig. 40]
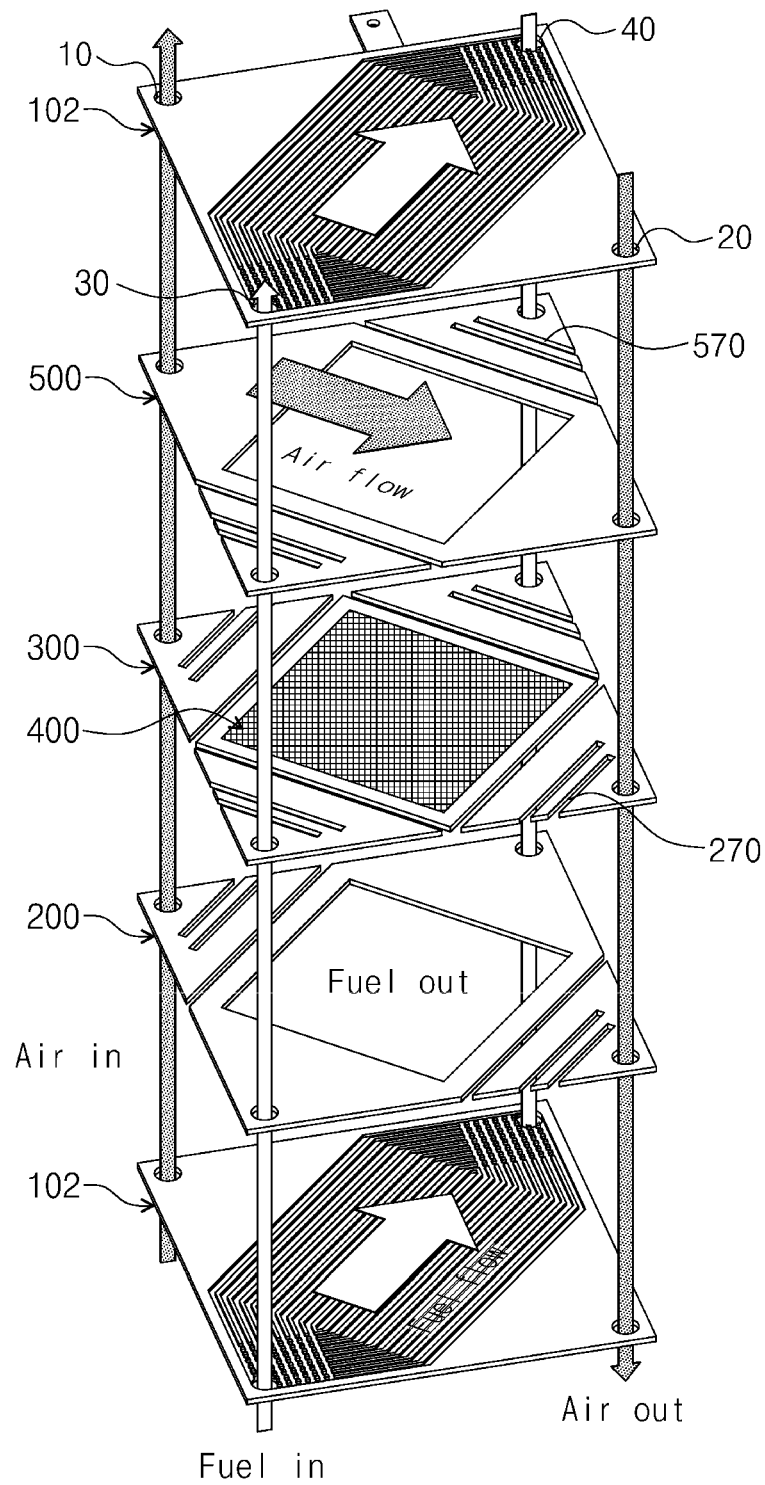

FUEL CELL STACK UNIT AND FUEL CELL STACK INCLUDING SAME

TECHNICAL FIELD

The present invention relates to a fuel cell stack unit and a fuel cell stack including the same, and more particularly, to a fuel cell stack unit which minimizes a decrease in the power generation efficiency of the fuel cell stack unit due to leakage of a gas, and a fuel cell stack including the same.

BACKGROUND ART

A fuel cell is a device which converts a change in free energy into electrical energy when a fuel and oxygen electrochemically react with each other. It is known that a solid oxide fuel cell, which uses an ion conductive oxide as an electrolyte, has an excellent energy conversion efficiency as it is operated at a high temperature of about 600 to 100 degrees to produce electrical energy and thermal energy. It can advantageously use various fuels, such as a natural gas and a fossil fuel gas, as a fuel due to an operation of a high temperature, and can be advantageously used for a long time because it does not have any problem, such as corrosion and loss of a material as a solid electrolyte and a solid electrode are used.

The forms of end cells for a solid oxide fuel cell may be classified into tubular type end cells and planar type end cells according to their shapes, and the tubular end cells can advantageously separate gases easily but disadvantageously has high loss of energy as the resistances thereof become higher due to the form of current collecting bodies which connect the end cells. The planar type end cells have low loss of energy due to structural characteristics of connecting the entire electrodes to the current collecting bodies but it is difficulty in sealing the planar type end cells.

In the planar solid oxide fuel cells, several end cells are connected in series to each other to increase generated electrical energy. This is called a stack, and the stack includes an end cell, a gas separator for supplying gases to a positive electrode and a negative electrode of the end cell such that the gases are not mixed, and a sealant. The sealant prevents mixing of the gases through a method of preventing mixing of the gases by applying a pressure, through a method of performing sealing by using glass, and by using the two methods.

However, in the case of a long time operation, fine gases may be leaked due to deterioration of the sealant. The leakage of the gases generates re-oxidation of a metallic catalyst used for the negative electrode, generates fine cracks, and deteriorates catalyst characteristics, and in the positive electrode, catalyst characteristics may be lowered by a fine change of structures of the oxide catalyst due to an increase of moisture.

Accordingly, the inventor(s) have invented a method capable of solving a defect of a solid oxide fuel cell and a problem of a decrease in power generation efficiency due to leaked gas.

DISCLOSURE

Technical Problem

The present invention provides a fuel cell stack unit which decreases a defect problem of a fuel cell due to leaked gas, and a fuel cell stack including the same.

The present invention also provides a fuel cell stack unit having improved power generation efficiency, and a fuel cell stack.

The present invention also provides a fuel cell stack unit having an improved reliability, and a fuel cell stack.

The present invention also provides a fuel cell stack unit having improved life span characteristics, and a fuel cell stack.

The objectives of the present invention are not limited to the above-described ones.

Technical Solution

In order to solve the technical objectives, the present invention provides a fuel cell stack unit.

According to an embodiment, a fuel cell stack unit includes a first gas separator having an air inlet formed therein, a first sealing gasket stacked on the lower side of the first gas separator and having an air inlet formed therein, a support stacked on the lower side of the first sealing gasket, in which an end cell for a fuel cell is accommodated at a center portion thereof, and having an air inlet formed at an outer peripheral side of the center portion thereof, a second sealing gasket stacked on the lower side of the support and having an air inlet formed therein, and a second gas separator stacked on the lower side of the second sealing gasket, wherein the air introduced from the air inlet of the first gas separator sequentially passes through the air inlets formed in the first sealing gasket, the support, and the second sealing gasket, and flows from one side to an opposite side of the end cell along a stack border between the lower side of the end cell and the upper side of the second gas separator, and wherein the second sealing gasket has a cut-off structure which is recessed inwards from an edge to an inside of the second sealing gasket such that the air, which has flowed the one side to the opposite side of the end cell, is discharged to the outside.

According to an embodiment, the air inlet formed in the first gas separator, the first sealing gasket, the support, and the second sealing gasket may communicate with each other in a stack direction of the first gas separator, the first sealing gasket, the support, and the second sealing gasket.

According to an embodiment, the pressure of the air flowing around the end cell may be made to be lower than the pressure of the fuel flowing around the end cell, by discharging the air, which has flowed to the opposite side of the end cell, to the outside through the cut-off structure.

According to an embodiment, in the cut-off structure, at least a portion of the edge of the second sealing gasket, which is adjacent to the opposite side of the end cell, may be recessed inwards.

According to an embodiment, in the cut-off structure, at least the entire edge of the second sealing gasket, which is adjacent to the opposite side of the end cell, may be recessed inwards.

According to an embodiment, the cut-off structure of the second sealing gasket includes an air outlet of the second sealing gasket, and the first gas separator and the support may communicate with the air outlet of the second sealing gasket in the stack direction.

According to an embodiment, at least one of the first sealing gasket and the support has a cut-off structure having the same shape as the cut-off structure of the second sealing gasket such that the air, which has flowed to the opposite side of the end cell, may be discharged to the outside.

According to an embodiment, the first sealing gasket, the support, the second sealing gasket, and the second gas separator may include fuel inlets which communicate with each other in the stack direction to supply the fuel to a stack border between the upper side of the end cell and the lower side of the first gas separator and fuel outlets which communicate with each other in the stack direction to discharge the fuel, which has flowed along the stack border between the upper side of the end cell and the lower side of the first gas separator.

According to an embodiment, the end cell may have an anode formed in the direction of the first gas separator with respect to an electrolyte and a cathode formed in the direction of the second gas separator, and the air, which has flowed along the stack border between the lower side of the end cell and the upper side of the second gas separator may be supplied to the cathode.

According to an embodiment, the cathode of the end cell for a fuel cell may include lanthanum strontium cobalt ferrite (LSCF).

According to an embodiment, the second gas separator may include a first channel which is adjacent to one side of the end cell such that the air introduced from the air inlet of the second sealing gasket is guided from one side to an opposite side of the end cell and a second channel which is adjacent to the opposite side of the end cell to be spaced apart from the first channel, on a first surface which faces the first gas separator.

In order to solve the technical objectives, the present invention provides another fuel cell stack unit.

According to an embodiment, another fuel cell stack unit may include a first gas separator including a second surface which provides a fuel passage, a first sealing gasket stacked on the lower side of the first gas separator, a support stacked on the lower side of the first sealing gasket and in which an end cell for a fuel cell is accommodated at a center portion thereof, a second sealing gasket stacked on the lower side of the support, and a second gas separator stacked on the lower side of the second sealing gasket and including a first surface which provides an air passage, wherein the first gas separator, the first and second sealing gaskets, and the support include air inlets and air outlets which provide an air passage in the stack direction of the first gas separator, the first and second sealing gaskets, and the support, and fuel inlets and fuel outlets which provide a fuel passage, and wherein the pressure of air in the interior of the air passage is made to be lower than the pressure of a fuel in the interior of the fuel passage.

According to an embodiment, the air introduced from the air inlet of the first gas separator may sequentially pass through the air inlets formed in the first sealing gasket, the support, and the second sealing gasket, and flows from one side to an opposite side of the end cell along a stack border between the lower side of the end cell and the upper side of the second gas separator, and the second sealing gasket may include a cut-off structure in which at least a portion of an edge of the second sealing gasket, which is adjacent to the opposite side of the end cell, is recessed inwards such that the air, which has flowed to the opposite side of the end cell is discharged to the outside.

According to an embodiment, the end cell may have an anode in the direction of the first gas separator with respect to an electrolyte and a cathode in the direction of the second gas separator, and the cathode may include lanthanum strontium cobalt ferrite (LSCF).

A fuel cell stack unit according to another embodiment of the present invention may include a first sealing gasket in which an end cell is accommodated at a center portion thereof, a second sealing gasket stacked on the first sealing gasket, configured to cover a peripheral portion of the end cell, and having a 2-1-th gas guide channel which opens the upper side of the end cell, and a third sealing gasket stacked on the upper side of the second sealing gasket, and including a 3-1-th gas guide channel which communicates with the 2-1-th gas guide channel in the stack direction, and a 3-3-th gas guide channel which discharges the gas in the 3-1-th gas guide channel to the outside.

According to anther embodiment, the second sealing gasket may further include an opening having an area, which is smaller than that of a surface of the end cell, and the 2-1 gas guide channel may be formed to be spaced apart from the opening.

According to another embodiment, the 2-1-th gas guide channel may have a closed loop shape which surrounds the opening.

According to another embodiment, the second sealing gasket further may include a 2-2-th gas guide channel which is spaced apart from the 2-1-th gas guide channel.

According to another embodiment, the 2-2-th gas guide channel may communicate with the 3-3-th gas guide channel in the stack direction.

According to another embodiment, the third sealing gasket may further include a 3-2-th gas guide channel which connects the 3-1-th gas guide channel and the 3-2-th gas guide channel in the direction of a surface of the third sealing gasket.

According to another embodiment, a first gas separator stacked on the lower side of the first sealing gasket and having a channel which provides an air flow in the direction of the surface of the end cell may be further included.

A fuel cell stack unit according to another embodiment of the present invention may include a first sealing gasket having an opening at a center portion, formed to be spaced apart from the opening, and having a gas guide channel configured to discharge a gas to the outside, and a second sealing gasket stacked on the first sealing gasket, and in which an end cell having an area, which is wider than that of the opening of the first sealing gasket, is accommodated, wherein the opening of the second sealing gasket further include an extension opening which extends to communicate with the gas guide channel of the first sealing gasket in a stack direction.

According to another embodiment, the fuel cell stack unit may further include a third sealing gasket stacked on the second sealing gasket and having an opening having a size, which is smaller than that of the opening of the first sealing gasket.

According to another embodiment, current collecting bodies may be provided in the opening of the first sealing gasket and the opening of the third sealing gasket, respectively.

According to another embodiment, the areas of the current collecting body provided in the opening of the first sealing gasket and the current collecting body provided in the opening of the third sealing gasket may be different.

According to another embodiment, a ratio of the areas of the third sealing gasket, which supports an upper surface of the end cell, and the current collecting body provided in the opening of the third sealing gasket, may be different from a ratio of the areas of the first sealing gasket, which supports a lower surface of the end cell, and the current collecting body provided in the opening of the first sealing gasket.

In order to solve the technical objectives, the present invention provides a fuel cell stack.

The fuel cell stack according to an embodiment of the present invention may have a structure in which the above-mentioned fuel cell stack units are successively stacked.

Advantageous Effects

According to an embodiment of the present invention, there may be provided a fuel cell stack unit including a first gas separator having an air inlet formed therein, a first sealing gasket stacked on the lower side of the first gas separator and having an air inlet formed therein, a support stacked on the lower side of the first sealing gasket, in which an end cell for a fuel cell is accommodated at a center portion thereof, and having an air inlet formed at an outer peripheral side of the center portion thereof, a second sealing gasket stacked on the lower side of the support and having an air inlet formed therein, and a second gas separator stacked on the lower side of the second sealing gasket, wherein the air introduced from the air inlet of the first gas separator sequentially passes through the air inlets formed in the first sealing gasket, the support, and the second sealing gasket, and flows from one side to an opposite side of the end cell along a stack border between the lower side of the end cell and the upper side of the second gas separator, and wherein the second sealing gasket has a cut-off structure which is recessed inwards from an edge to an inside of the second sealing gasket such that the air, which has flowed the one side to the opposite side of the end cell, is discharged to the outside.

First, a gas guide channel may be included on sides of the air and fuel passages of the first and second sealing gaskets. By the gas guide channels, deterioration of the characteristics of the end cell for a fuel cell due to leakage of the air and the fuel to the end cell for a fuel cell through the air and fuel passages can be minimized.

Further, the air, which has flowed to one side to an opposite side of the end cell for a fuel cell, and the air, which includes reaction residuals in the cathode, for example, oxygen of a low concentration left after the reaction, may be immediately discharged to the outside through the cut-off structure of the second sealing gasket. Accordingly, the air, which has not been supplied to the cathode of the end cell for a fuel cell, and the reactant residuals in the cathode can be restrained from being reversed and introduced to the anode and the cathode of the end cell for a fuel cell.

In addition, the pressure of the air which flows around the end cell for a fuel cell can be made to be lower than the pressure of the fuel which flows around the end cell for a fuel cell, by easily discharging the air, which has flowed to the opposite side of the end cell 400 for a fuel cell, to the outside through the cut-off structure of the second sealing gasket. In other words, in the fuel cell stack unit according to the embodiment of the present invention, the pressure of the fuel in the interior of the fuel passage can be higher than the pressure of the air in the interior of the air passage. Accordingly, leakage of the air to the anode through the fuel passage can be prevented, and thus occurrence of a severe defect in the end cell for a fuel cell due to re-oxidation of the nickel of the anode to nickel oxide can be minimized.

Further, because a material (e.g., LSCF) which does not deteriorate characteristics of a battery by maintaining a stable phase even when the fuel is leaked is used in the cathode of the fuel cell stack unit according to the embodiment of the present invention, deterioration of characteristics of the battery, which appears when the fuel is leaked to the cathode 430 in the case in which the pressure of the fuel in the interior of the fuel passage is higher than the pressure of the air in the interior of the air passage can be minimized.

DESCRIPTION OF THE INVENTION

FIG. 1 is a view illustrating a first gas separator according to an embodiment of the present invention;

FIG. 2 is a sectional view, which is taken along line A-A' of FIG. 1, of the first gas separator according to the embodiment of the present invention;

FIG. 3 is a view illustrating a first sealing gasket according to the embodiment of the present invention;

FIG. 4 is a view illustrating a metal support according to the embodiment of the present invention;

FIG. 5 is a view illustrating a second sealing gasket according to the embodiment of the present invention;

FIGS. 6 and 7 are sectional views illustrating the shape of the second sealing gasket according to the embodiment of the present invention;

FIGS. 8 and 9 are views illustrating a second gas separator according to the embodiment of the present invention;

FIG. 10 is an exploded perspective view illustrating a fuel cell stack unit according to the embodiment of the present invention;

FIGS. 11 to 16 are views illustrating a fuel cell stack unit having a general structure according to a comparative example for the embodiment of the present invention;

FIGS. 17 to 19 are views illustrating flows of air and a fuel in the fuel cell stack unit according to the embodiment of the present invention;

FIGS. 20 and 21 are views illustrating a fuel cell stack according to the embodiment of the present invention;

FIG. 22 is a view illustrating an application example of a fuel cell stack for generation of power including the fuel cell stack unit according to the embodiment of the present invention;

FIG. 23 is a view illustrating a first gas separator according to a second embodiment of the present invention;

FIG. 24 is a view illustrating a first sealing gasket according to the second embodiment of the present invention;

FIG. 25 is a view illustrating a second sealing gasket according to the second embodiment of the present invention;

FIG. 26 is a view illustrating a third sealing gasket according to the second embodiment of the present invention;

FIG. 27 is a view illustrating a fourth sealing gasket according to the second embodiment of the present invention;

FIG. 28 is a view illustrating a second gas separator according to the second embodiment of the present invention;

FIG. 29 is an exploded perspective view illustrating a fuel cell stack according to the second embodiment of the present invention;

FIGS. 30 and 31 are views illustrating a gas discharging method of a fuel cell stack unit according to the second embodiment of the present invention;

FIG. 32 is a view illustrating a cathode of a first gas separator according to a third embodiment of the present invention;

FIG. 33 is a view illustrating a first sealing gasket according to the third embodiment of the present invention;

FIG. 34 is a view illustrating a second sealing gasket according to the third embodiment of the present invention;

FIG. 35 is a view illustrating a third sealing gasket according to the third embodiment of the present invention;

FIG. 36 is a view illustrating an anode of the second gas separator according to the third embodiment of the present invention;

FIG. 37 is an exploded perspective view illustrating a fuel cell stack according to the third embodiment of the present invention;

FIGS. 38 and 39 are views illustrating a gas discharging method of a fuel cell stack unit according to the third embodiment of the present invention; and FIG. 40 is a view illustrating a modified example related to a direction of an end cell in the fuel cell stack unit according to the embodiment of the present invention.

BEST MODE

Hereinafter, preferred embodiments of the present invention will be described in detail with reference to the accompanying drawings. However, the technical spirit of the present invention is not limited to the embodiments, but may be realized in different forms. The embodiments introduced here are provided to sufficiently deliver the spirit of the present invention to those skilled in the art so that the disclosed contents may become thorough and complete.

When it is mentioned in the specification that one element is on another element, it means that the first element may be directly formed on the second element or a third element may be interposed between the first element and the second element. Further, in the drawings, the shapes and thicknesses of the shapes are exaggerated for efficient description of the technical contents.

Further, in the various embodiments of the present invention, the terms such as first, second, and third are used to describe various elements, but the elements are not limited to the terms. The terms are used only to distinguish one element from another element. Accordingly, an element mentioned as a first element in one embodiment may be mentioned as a second element in another embodiment. The embodiments illustrated here include their complementary embodiments. Further, the term "and/or" in the specification is used to include at least one of the elements enumerated in the specification.

In the specification, the terms of a singular form may include plural forms unless otherwise specified. In the specification, the terms "including" and "having" are used to designate that the features, the numbers, the steps, the elements, or combinations thereof described in the specification are present, and may be understood that one or more other features, numbers, step, elements, or combinations thereof may be added.

Further, in the following description of the present invention, a detailed description of known functions and configurations incorporated herein will be omitted when it may make the subject matter of the present invention rather unclear.

FIG. 1 is a view illustrating a first gas separator according to an embodiment of the present invention, FIG. 2 is a sectional view, which is taken along line A-A' of FIG. 1, of the first gas separator according to the embodiment of the present invention, FIG. 3 is a view illustrating a first sealing gasket according to the embodiment of the present invention, FIG. 4 is a view illustrating a metal support according to the embodiment of the present invention, FIG. 5 is a view illustrating a second sealing gasket according to the embodiment of the present invention, FIGS. 6 and 7 are sectional views illustrating the shape of the second sealing gasket according to the embodiment of the present invention, FIGS. 8 and 9 are views illustrating a second gas separator according to the embodiment of the present invention, FIG. 10 is an exploded perspective view illustrating a fuel cell stack unit according to the embodiment of the present invention, FIGS. 11 to 16 are views illustrating a fuel cell stack unit having a general structure according to a comparative example for the embodiment of the present invention, and FIGS. 17 to 19 are views illustrating flows of air and a fuel in the fuel cell stack unit according to the embodiment of the present invention.

Referring to FIGS. 1 to 10, the fuel cell stack unit 1000 according to the first embodiment of the present invention may include a first gas separator 101, a first sealing gasket 200, a metal support 300, an end cell 400 for a fuel cell, a second sealing gasket 500, and a second gas separator 102.

The first gas separator 101 may include an air inlet 10 and an air outlet 20 which provide an air passage, and a fuel inlet 30 and a fuel outlet 40 which provide a fuel passage.

The air inlet 10 and the air outlet 20 of the first gas separator 101 may communicate with the air inlet 10 and the air outlet 20, which are formed in a first sealing gasket 200 stacked on the lower side (a second surface 101b) of the first gas separator 101, which will be described below, in the stack direction. Accordingly, air introduced from the air inlet 10 of the first gas separator 101 may pass through the air inlet 10 formed in the first sealing gasket 200. Further, air discharged from the air outlet 20 of the first sealing gasket 200 may be discharged to the outside through the air outlet 20 of the first gas separator 101.

The fuel inlet 30 and the fuel outlet 40 of the first gas separator 101 may communicate with the fuel inlet 30 and the fuel outlet 40, which are formed in a first sealing gasket 200 stacked on the lower side (the second surface 101b) of the first gas separator 101, which will be described below, in the stack direction. Further, the fuel inlet 30 and the fuel outlet 40 of the first gas separator 101 may include a third channel 30a and a fourth channel 40a which provide the fuel passage on the second surface 101b.

Accordingly, a fuel introduced from the fuel inlet 30 of the first sealing gasket 400, which will be described below, flows to the fuel outlet 40 of the first gas separator 101 via the third channel 30a and the fourth channel 40a of the first gas separator 101 and flows on the second surface 101b of the first gas separator 101. Further, at least a portion of the fuel, which flows on the second surface 101b of the first gas separator 101, may flow from one side to an opposite side of the end cell 400 for a fuel cell along a stack border between the lower side (the second surface 101b) of the first gas separator 101 and the upper side of the end cell 400 for a fuel cell accommodated at a center portion of a metal support 300, which will be described below, and may be supplied to the anode 420 of the end cell 400 for a fuel cell at the same time.

According to an embodiment, as illustrated in FIG. 2, the third channel 30a and the fourth channel 40a may have a structure in which ridges R and valleys V are periodically repeated. Then, the ridges R and the valleys V of the third channel 30a and the fourth channel 40a may have the same height and the same depth. Unlike this, the height difference between the ridges R and the valleys V of the third channel 30a may be smaller than the height difference between the ridges R and the valleys V of the fourth channel 40a. Accordingly, because the pressure of the fuel flowing in the third channel 30a is higher than the pressure of the fuel flowing in the fourth channel 40a, the fuel may easily flow from the third channel 30a to the fourth channel 40a.

Further, according to an embodiment, the third channel 30a and the fourth channel 40a may have the same length. Unlike this, the length of the third channel 30a may be longer than the length of the fourth channel 40a. Accordingly, the fuel introduced from the fuel inlet 30 of the first sealing gasket 200, which will be described below, may be easily converged by the third channel 30a and thus may flow to the fourth channel 40a.

According to an embodiment, the air inlet 10 and the air outlet 20 of the first gas separator 101 may further include a first channel 10a and a second channel 20a, which provide the air passage, on an upper surface 101a (an opposite surface of FIG. 1) of the first gas separator 101. The structure of the first gas separator 101 may be the same as the second gas separator 102, which will be described below. A description of the second gas separator 102, which will be described below, will be referenced for the structures and functions of the first and second channels 10a and 10b of the first gas separator 101.

The first sealing gasket 200 is stacked on the lower side (the second surface 101b) of the first gas separator 101, and may include an air inlet 10 and an air outlet 20 which provide the air passage and a fuel inlet 30 and a fuel outlet 40 which provide the fuel passage as in the first gas separator 101.

The air inlet 10 and the air outlet 20 of the first sealing gasket 200 may communicate with the air inlet 10 and the air outlet 20, which are formed in the metal support 300 stacked on the lower side of the first sealing basket 200, which will be described below, in the stack direction. Accordingly, air introduced from the air inlet 10 of the first gas separator 101 may sequentially pass through the air inlets 10 formed in the first sealing gasket 200 and the metal support 300, which will be described below. Further, air discharged from the air outlet 20 of the metal support 300, which will be descried below, may be sequentially discharged to the outside through the air outlets 20 of the first sealing gasket 200 and the first gas separator 101.

The fuel inlet 30 and the fuel outlet 40 of the first sealing gasket 200 may communicate with the fuel inlet 30 and the fuel outlet 40, which are formed in the metal support 300 stacked on the lower side of the first sealing basket 200, which will be described below, in the stack direction. Accordingly, the fuel introduced from the fuel inlet 30 of the metal support 300, which will be described below, may reach the fuel inlet 30 of the first gas separator 101 after passing through the fuel inlet 30 of the first sealing gasket 200, and may flow on the second surface 101b through the third and fourth channels 30a and 40a as described above. At least a portion of the fuel, which flows on the second surface 101b of the first gas separator 101, may flow from one side to an opposite side of the end cell 400 for a fuel cell along a stack border between the lower side (the second surface 101b) of the first gas separator 101 and the upper side of the end cell 400 for a fuel cell accommodated at a center portion of a metal support 300, which will be described below, and may be supplied to the anode 420 of the end cell 400 for a fuel cell at the same time.

According to an embodiment, the first sealing gasket 200 may include a first current collecting unit 250 at a location at which the first sealing gasket 200 overlaps the end cell 400 for a fuel cell accommodated at the center portion of the metal support 300, which will be described below. It may be identified through a current collected in the first current collecting unit 250 of the first sealing gasket 200 whether the fuel cell stack unit 1000 according to the embodiment of the present invention is abnormal. According to an embodiment, the first current collecting unit 250 may be formed of a metal mesh, metal foam, or a combination thereof.

Further, according to an embodiment, the size of the first current collecting unit 250 may be smaller than the size of the end cell 400 for a fuel cell accommodated at the center portion of the metal support 300, which will be described below. Unlike this, the size of the first current collecting unit 250 may have the same as that of the end cell 400 for a fuel cell. In this case, an outer edge of the first current collecting unit 250, that is, an inner edge of the first sealing gasket 200 may overlap an edge of the end cell 400 for a fuel cell. Accordingly, the efficiency of sealing between the first sealing gasket 200 and the metal support 300, which will be described above, may be improved. Unlike this, of course, the size of the first current collecting unit 250 may be larger than that of the end cell 400.

Further, according to an embodiment, the first sealing gasket 200 may further include a gas guide channel 270 on the sides of the air inlet 10 and the air outlet 20 of the first sealing gasket 200. Through the gas guide channel 270, the amount of the fuel leaked from the fuel inlet 30 and the fuel outlet 40 of the first sealing gasket 200 to the end cell 400 for a fuel cell can be minimized.

The metal support 300 is stacked on the lower side of the first sealing gasket 200, and may include an air inlet 10 and an air outlet 20 which provide the air passage and a fuel inlet 30 and a fuel outlet 40 which provide the fuel passage as in the first gas separator 101 and the first sealing gasket 200.

The air inlet 10 and the air outlet 20 of the metal support 300 may communicate with the air inlet 10 and the air outlet 20, which are formed in the second sealing gasket 500 stacked on the lower side of the metal support 300, which will be described below, in the stack direction.

Accordingly, air introduced from the air inlet 10 of the first gas separator 101 may sequentially pass through the air inlets 10 formed in the first sealing gasket 200 and the metal support 300, and the second sealing gasket 500, which will be described below. Further, air discharged from the air outlet 20 of the second sealing gasket 500, which will be descried below, may be sequentially discharged to the outside through the air outlets 20 of the metal support 300, the first sealing gasket 200, and the first gas separator 101.

The fuel inlet 30 and the fuel outlet 40 of the metal support 300 may communicate with the fuel inlet 30 and the fuel outlet 40, which are formed in the second sealing gasket 500 stacked on the lower side of the metal support 300, which will be described below, in the stack direction. Accordingly, the fuel introduced from the fuel inlet 30 of the second sealing gasket 500, which will be described below, may reach the fuel inlet 30 of the first gas separator 101 after passing through the fuel inlets 30 of the metal support 300 and the first sealing gasket 200, and may flow on the second surface 101b through the third and fourth channels 30a and 40a as described above.

At least a portion of the fuel, which flows on the second surface 101b of the first gas separator 101, may flow from one side to an opposite side of the end cell 400 for a fuel cell along a stack border between the lower side (the second surface 101b) of the first gas separator 101 and the upper side of the end cell 400 for a fuel cell accommodated at a center portion of a metal support 300.

As described above, the end cell 400 for a fuel cell may be accommodated at the center portion of the metal support 300. The end cell 400 for a fuel cell may have an anode 420 formed in the direction of the first gas separator 101 with respect to an electrolyte, and may have a cathode (430) in the direction of the second gas separator 102, which will be described below, and may be supplied to the anode 420 of the end cell 400 for a fuel cell at the same time.

According to an embodiment, the cathode 430 of the end cell 400 for a fuel cell may include lanthanum strontium cobalt ferrite (LSCF). When the cathode 430 includes the LSCF, deterioration of the characteristics of the fuel cell stack unit 1000 for a fuel cell due to water generated in the cathode 430 when the fuel is introduced into the cathode 430 may be minimized.

Meanwhile, in the specification, the metal support may be referred to as a sealing gasket.

The second sealing gasket 500 is stacked on the lower side of the metal support 300, and may include an air inlet 10 and an air outlet 20 which provide the air passage and a fuel inlet 30 and a fuel outlet 40 which provide the fuel passage as in the first gas separator 101, the second sealing gasket 500, and the metal support 300.

The air inlet 10 and the air outlet 20 of the second sealing gasket 500 may communicate with the air inlet 10 and the air outlet 20, which are formed in the second gas separator 102 stacked on the lower side of the second sealing basket 500, which will be described below, in the stack direction. Accordingly, air introduced from the air inlet 10 of the first gas separator 101 may reach the air inlet 10 of the second gas separator 102, which will be described below, after sequentially passing through the air inlets 10 formed in the first sealing gasket 200 and the metal support 300, and the second sealing gasket 500.

Further, the second sealing gasket 500 may include a cut-off structure 25 which is recessed inwards from the edge of the second sealing gasket 500 such that the air discharged from the air outlet 20 of the second gas separator 102, which will be described below, is discharged to the outside.

The cut-off structure 25 may include the air outlet 20 of the second sealing gasket 500. Accordingly, the cut-off structure 25 of the second sealing gasket 500 may communicate with the air outlets 20 of the first gas separator 101, the first sealing gasket 200, and the metal support 300 in the stack direction.

According to an embodiment, as illustrated in FIG. 5, the cut-off structure 25 may have a structure in which at least a portion of the edge of the second sealing gasket 500, which is adjacent to an opposite side of the end cell 400 for a fuel cell is recessed inwards.

Further, according to an embodiment, the cut-off structure 25 may have a structure in which the entire edge of the second sealing gasket 500, which is adjacent to an opposite side of the end cell 400 for a fuel cell is recessed inwards.

Unlike this, the air inlet 10 of the second sealing gasket 500 may be located to be spaced apart from the edge of the second sealing gasket 500 by a specific interval g.

According to an embodiment, as can be seen in FIGS. 6 and 7, the cell-center line (C-CL) of the end cell 400 for a fuel cell, by which the left area and the right area of the end cell 400 for a fuel cell are made to be the same, may not coincide with the sealing gasket-center line (S-CL) of the second sealing gasket 500, by which the left area and the right area of the second sealing gasket 500 are made to be the same by the cut-off structure 25. This may be understood that, due to the cut-off structure 25 included in the second sealing gasket 500, the sealing gasket-center line (S-CL) of the second sealing gasket 500, by which the left area and the right area of the second sealing gasket 500 are made to be the same, is biased to a direction in which the cut-off structure 25 is not formed rather to the cell-center line (C-CL) of the end cell 400 for a fuel cell, by which the left area and the right area of the end cell 400 for a fuel cell is made to be the same.

Further, according to an embodiment, the second sealing gasket 500 may include a second current collecting unit 550 at a location at which the second sealing gasket 500 overlaps the end cell 400 for a fuel cell accommodated at the center portion of the metal support 300. It may be identified through a current collected in the second current collecting unit 550, and the first current collecting unit 250 of the first sealing gasket 200 whether the fuel cell stack unit 1000 according to the embodiment of the present invention is abnormal.

According to an embodiment, the size of the second current collecting unit 550 may be the same as or smaller than the size of the end cell 400. For example, when the sizes of the second current collecting unit 550 and the end cell 400 are the same, the second current collecting unit 550 and the end cell 400 may be stacked such that an outer edge of the second current collecting unit 550, that is, an inner edge of the second sealing gasket 500 and an edge of the end cell 400 for a fuel cell overlap each other. Unlike this, of course, the size of the second current collecting unit 550 may be larger than that of the end cell 400.

According to an embodiment, the first current collecting unit 250, the end cell 400 for a fuel cell, and the second current collecting unit 550 may have the same size. In this case, the first current collecting unit 250, the end cell 400 for a fuel cell, and the second current collecting unit 550 may be stacked to have the same edge line. Accordingly, the efficiency of sealing between the first sealing gasket 200 including the first current collecting unit 250, the end cell 400 for a fuel cell, and the second sealing gasket 500 including the second current collecting unit 550 may be improved.

Further, according to an embodiment, the second sealing gasket 500 may further include a gas guide channel 570 on the sides of the fuel inlet 30 and the fuel outlet 40 of the second sealing gasket 500. Through the gas guide channel 570, the amount of the air leaked from the air inlet 10 and the air outlet 20 of the second sealing gasket 500 to a negative electrode of the end cell 400 for a fuel cell can be minimized.

The second gas separator 102 is stacked on the lower side of the second sealing gasket 500, and may include an air inlet 10 and an air outlet 20 which provide the air passage and a fuel inlet 30 and a fuel outlet 40 which provide the fuel passage as in the first gas separator 101, the second sealing gasket 500, and the metal support 300.

As described above, the air inlet 10 and the air outlet 20 of the second gas separator 102 may communicate with the air inlet 10 and the air outlet 20 of the second sealing gasket 500 stacked on the first surface 102*a* of the second gas separator 102 in the stack direction. Accordingly, air introduced from the air inlet 10 of the first gas separator 101 may reach the air inlet 10 of the second gas separator 102 after sequentially passing through the air inlets 10 formed in the first sealing gasket 200 and the metal support 300, and the second sealing gasket 500.

The air inlet 10 and the air outlet 20 of the second gas separator 102 may include a first channel 10*a* and a second channel 20*a* which provide the air passage, on the first surface 102*a*. Accordingly, air which has been introduced from the air inlet 10 of the first gas separator 101 and has sequentially passed through the air inlets 30 formed in the first sealing gasket 200 and the metal support 300, and the second sealing gasket 500 may reach the air inlet 10 of the second gas separator 102. The air, which has reached to the air inlet 10 of the second gas separator 102, may flow to the air outlet 20 of the second gas separator 102 via the first channel 10a and the second channel 20a, and may flow to the first surface 102a of the second gas separator 102.

Further, at least a portion of the air, which flows on the first surface 102a of the second gas separator 102, may flow from the opposite side to the one side of the end cell 400 for a fuel cell along the stack border between the upper side (the first surface 102a) of the second gas separator 102 and the lower side of the end cell 400 for a fuel cell accommodated at the center portion of a metal support 300, and may be supplied to the cathode 420 of the end cell 400 for a fuel cell at the same time.

According to an embodiment, as in the third channel 30a and the fourth channel 40a, the first channel 10a and the second channel 20a may have a structure in which ridges R and valleys V are periodically repeated. Then, the ridges R and the valleys V of the first channel 10a and the second channel 20a may have the same height and the same depth. Unlike this, the height difference between the ridges R and the valleys V of the first channel 10a may be smaller than the height difference between the ridges R and the valleys V of the second channel 20a. Accordingly, because the pressure of the air flowing in the first channel 10a is higher than the pressure of the air flowing in the second channel 20a, the air may easily flow from the first channel 10a to the second channel 20a.

Further, according to an embodiment, the first channel 10a and the second channel 20a may have the same length. Unlike this, the length of the first channel 10a may be longer than the length of the second channel 20a. Accordingly, the air introduced from the air inlet 10 of the second sealing gasket 500 may be easily converged by the first channel 10a and thus may flow to the second channel 20a.

Referring to FIG. 10, as described above, air introduced from the air inlet 10 of the first gas separator 101 may reach the air inlet 10 of the second gas separator 102 after sequentially passing through the air inlets 10 formed in the first sealing gasket 200 and the metal support 300, and the second sealing gasket 500. The air, which has reached to the air inlet 10 of the second gas separator 102, may flow along a stack border between the lower side of the end cell 400 for a fuel cell and the upper side (the first surface 102a) of the second gas separator 102 through the first and second channels 10a and 20a formed on the first surface 102a and at least a portion of the air may be supplied to the cathode 430 of the end cell 400 for a fuel cell.

The air, which has not supplied to the cathode 430 of the end cell 400 for a fuel cell, and the air which accommodates reaction residuals in the cathode 430, for example, oxygen of a low concentration left after a reaction, may reach the air outlet 20 of the second gas separator 102, and may be immediately discharged to the outside through the cut-off structure 25 (see FIG. 10) of the second sealing gasket 500 stacked on the upper side (the first surface 102a) of the second gas separator 102.

According to an embodiment, at least one of the metal support 300 and the first sealing gasket 200, which are located on the upper side of the second sealing gasket 500, may include the cut-off structure 25 having the same shape as the cut-off structure 25 of the second sealing gasket 500. The cut-off structure 25 formed in the metal support 300 and/or the first sealing gasket 200 may immediately discharge the air which has not been discharged through the cut-off structure 25 of the second sealing gasket 500 and at least a portion of the reaction residuals in the cathode 430 to the outside.

Further, according to an embodiment, the first and second gas separators 101 and 102 may further include the cut-off structure 25 having the same shape as the cut-off structure 25 of the second sealing gasket 102. The air, which has not been discharged to the outside through the cut-off structures 25 of the second sealing gasket 500, the metal support 300, and the first sealing gasket 200, and the reaction residuals in the cathode 430 may be immediately discharged to the outside through the cut-off structure 25 of the first gas separator 101 and/or the second sealing gasket 102.

Further, a fuel which has been introduced from the fuel inlet 30 of the second gas separator 102 and has sequentially passed through the fuel inlets 30 formed in the second sealing gasket 500 and the metal support 300, and the first sealing gasket 100 may reach the fuel inlet 30 of the first gas separator 101. The fuel, which has reached to the fuel inlet 30 of the first gas separator 101, may flow along a stack border between the lower side (the second surface 101b) of the first gas separator 101 and the upper side end cell 400 for a fuel cell through the third and fourth channels 30a and 40a formed on the second surface 101b and at least a portion of the fuel may be supplied to the anode 420 of the end cell 400 for a fuel cell.

The fuel, which has not been supplied to the anode 420 of the end cell 400 for a fuel cell, may reach the fuel outlet 40 of the first gas separator 101, and may be discharged to the outside through the fuel outlets 40 formed in the first sealing gasket 200, the metal support 300, and the second sealing gasket 500 stacked on the lower side (the second surface 101b) of the first gas separator 101.

Unlike in the fuel cell stack unit 1000 according to the embodiment of the present invention, as illustrated in FIG. 9A, in the fuel cell stack unit having a general structure in which the second sealing gasket 500 does not include the cut-off structure 25, the air introduced from the air inlet 10 of the first gas separator 101 may reach the air inlet 10 of the second gas separator 102 after sequentially passing through the air inlets 10 formed in the first sealing gasket 200, the metal support 300, and the second sealing gasket 500. The air, which has reached to the second gas separator 102, may flow in the direction of the air outlet 20 of the second gas separator 102 through the first and second channels 10a and 20a formed on the first surface 102a, and at least a portion of the air may be supplied to the cathode 430 of the end cell 400 for a fuel cell through a stack border between the upper side (the first surface 102a) of the second gas separator 102 and the lower side of the end cell 400 for a fuel cell.

Further, the air, which has not been supplied to the cathode 430, may flow to the air outlet 20 of the second gas separator 102, and may be discharged to the outside through the air outlets 20 formed in the second sealing gasket 500, the metal support 300, the first sealing gasket 200, and the first gas separator 101 stacked on the first surface 102a.

Referring to FIG. 12, fuel which has been introduced from the fuel inlet 30 of the second gas separator 102 and has sequentially passed through the fuel inlets 30 formed in the second sealing gasket 500, and the metal support 300, and the first sealing gasket 100 may reach the fuel inlet 30 of the first gas separator 101. The fuel, which has reached to the first gas separator 101, may flow in the direction of the fuel outlet 40 of the first gas separator 101 through the third and fourth channels 30a and 40a formed on the second surface 101b, and at least a portion of the fuel may be supplied to the anode 420 of the end cell 400 for a fuel cell through a stack border between the lower side (the second surface 101b) of the first gas separator 101 and the upper side of the end cell 400 for a fuel cell.

In the above-mentioned fuel cell stack unit having a general structure, air and/or the fuel may be leaked through the interfaces between the first and second gas separators 101 and 102, the first and second sealing gaskets 500 and 200, and the metal support 300 according to physical characteristics of the gasket, deterioration of the fuel cell stack unit, and/or the bonding states between the elements of the fuel cell stack unit.

As illustrated in FIG. 13, when the air is leaked to the anode 420 through the second sealing gasket 500, the interface between the second sealing gasket 500 and the first gas separator 101, and the interface between the second sealing gasket 500 and the metal support 300, nickel accommodated in the anode 420 is oxidized to nickel oxide (NiO) again to generate a crack in the end cell 400 for a fuel cell. Further, as illustrated in FIG. 10B, when the fuel is leaked to the cathode 430 through the first sealing gasket 500, the interface between the first sealing gasket 500 and the metal support 300, and the interface between the first sealing gasket 500 and the second gas separator 102, the electrical characteristics of the end cell 400 for a fuel cell may deteriorate due to the water generated in the cathode 430.

According to the fuel cell stack unit 1000 according to the embodiment of the present invention, as illustrated in FIGS. 17 and 18, the gas guide channels 270 and 570 may be formed in the first and second sealing gaskets 200 and 500 between the air passage and the anode and/or between the fuel passage and the cathode to solve the problems which appear in the above-mentioned fuel cell stack unit having a general structure. Further, a portion of the gas guide channels 270 and 570 may be formed in the metal support plate 300. By the gas guide channels 270 and 570, deterioration of the characteristics of the end cell 400 for a fuel cell due to leakage of the air and the fuel to the end cell 400 for a fuel cell through the air and fuel passages can be minimized.

In more detail, the air and the fuel supplied to the fuel cell stack unit may be higher than the air pressure (atmospheric pressure) of the outside of the fuel cell stack unit. As can be seen in FIGS. 15 and 16, when the pressure of the air of the interior of the air passage, which has been supplied to the fuel cell stack unit, is higher than the pressure of the fuel in the interior of the fuel passage, a possibility of leaking the air to the anode 420 may be increased. In this case, as mentioned above, the nickel of the anode 420 may be oxidized to nickel oxide again and may cause a severe defect in the end cell 400 for a fuel cell.

To the contrary, when the pressure of the fuel in the interior of the fuel passage supplied to the fuel cell stack unit is higher than the pressure of the air in the interior of the air passage, a possibility of leaking the fuel to the cathode 430 may be increased. In this case, as mentioned above, water is produced in the cathode 430 and the battery characteristics of the fuel cell stack unit may deteriorate. Accordingly, as in FIGS. 12A and 12B, deterioration of characteristics can be prevented by forming the gas guide channels 270 and 570 between the air passage and the anode and/or the fuel passage and the cathode in the first and second sealing gaskets 200 and 500.

Further, referring to FIG. 19, the second sealing gasket 500 of the fuel cell stack unit 1000 according to the embodiment of the present invention may have a cut-off structure 25 which is recessed inwards from an edge of the second sealing gasket 500. Accordingly, the air, which has flowed to one side to an opposite side of the end cell 400 for a fuel cell, and the reaction residuals in the cathode 430 can be immediately discharged to the outside through the cut-off structure 25 of the second sealing gasket 500.

In addition, the pressure of the air which flows around the end cell 400 for a fuel cell can be made to be lower than the pressure of the fuel which flows around the end cell 400 for a fuel cell, by discharging the air, which has flowed to the opposite side of the end cell 400 for a fuel cell, to the outside through the cut-off structure 25 of the second sealing gasket 500. In other words, in the fuel cell stack unit 1000 according to the embodiment of the present invention, the pressure of the fuel in the interior of the fuel passage can be higher than the pressure of the air in the interior of the air passage. Accordingly, leakage of the air to the anode 420 through the fuel passage can be prevented, and thus occurrence of a severe defect in the end cell 400 for a fuel cell due to re-oxidation of the nickel of the anode 420 to nickel oxide can be minimized.

Further, because a material (e.g., LSCF) which does not deteriorate characteristics of a battery by maintaining a stable phase even when the fuel is leaked is used in the cathode 430 of the fuel cell stack unit 1000 according to the embodiment of the present invention, deterioration of characteristics of the battery, which appears when the fuel is leaked to the cathode 430 in the case in which the pressure of the fuel in the interior of the fuel passage is higher than the pressure of the air in the interior of the air passage can be minimized.

In the embodiment illustrated in FIG. 19, the cut-off structure 25 which is recessed inwards from an edge of the second sealing gasket 500 has been described. Unlike this, of course, at least one of the first gas separator 101, the first sealing gasket 200, the metal support 300, and the second gas separator 102 may have the cut-off structure. In this case, the cut-off structures formed in the first gas separator 101, the first sealing gasket 200, the metal support 300, and the second gas separator 102 may be stacked on the cut-off structure of the second sealing gasket 500. Further, of course, the cut-off structures formed in the first gas separator 101, the first sealing gasket 200, the metal support 300, and the second gas separator 102 may have the shape, which has been described with reference to FIG. 8 or 9.

Hereinafter, a fuel cell stack according to the embodiment of the present invention will be described.

FIGS. 20 and 21 are views illustrating a fuel cell stack according to the embodiment of the present invention. In detail, FIG. 20 illustrates a section of the fuel cell stack according to the embodiment of the present invention, and FIG. 21 is an exploded perspective view illustrating a fuel cell stack unit according to the embodiment of the present invention. Prior to the description of the fuel cell stack of FIG. 20 according to the embodiment of the present invention, FIGS. 1 to 10 and 17 to 19 will be referenced for the repeated parts of the prior description of the fuel cell stack unit of FIGS. 1 to 10 and 17 to 19 according to the embodiment of the present invention.

Referring to FIG. 20, the fuel cell stack 2000 according to the embodiment of the present invention may include an intermediate gas separator 105, and a 1-2-th sealing gasket 500 (1-2), a first metal support 301, an end cell 401 for a first fuel cell, a 1-1-th sealing gasket 200 (1-1), and a first gas separator 101, which are sequentially staked on the upper side of the intermediate gas separator 105, and may include a 2-1 th sealing gasket 200 (2-1), a second metal support 302, a second end cell 402 for a fuel cell, a 2-2 th sealing gasket 500 (2-2), and a second gas separator 102, which are sequentially stacked on the lower side of the intermediate gas separator 105.

The intermediate gas separator 105 and the first and second gas separators 101 and 102, the 1-1-th and 2-1-th sealing gaskets 200 (1-1) and 500 (2-1), the first and second metal supports 301 and 302, the first and second end cells 401 and 402 for a fuel cell, and the 1-2-th and 2-2-th sealing gaskets 200 (1-2) and 500 (1-2) of the fuel cell stack 2000 according to the embodiment of the present invention may be the same as the first and second gas separators 101 and 102, the first sealing gasket 200, the metal support 300, the end cell 400 for a fuel cell, and the second sealing gasket 500 of the fuel cell stack unit 100 according to the embodiment of the present invention, respectively.

Accordingly, the intermediate gas separator 105 may include first and second channels which provide an air passage to the air flowing from one side to an opposite side of the first end cell 401 for a fuel cell, on the upper surface of the intermediate gas separator 105. Further, third and fourth channels which provide a fuel passage to the fuel flowing from one side to an opposite side of the end cell 402 for the second fuel cell may be included on the lower surface of the intermediate gas separator 105.

The air introduced from the air inlet 10 of the first gas separator 101 may include a first flow in which the air flows to the air inlet 10 of the intermediate gas separator 105, and a second flow in which the air, which has reached to the air inlet 10 of the intermediate gas separator 105, flows to the air inlet 10 of the second gas separator 102.

In detail, the first flow may include flows of the air, which has been introduced from the air inlet 10 of the first gas separator 101, from one side to an opposite side of the first end cell 401 for a fuel cell along a stack border between the lower side of the first end cell 401 for a fuel cell and the upper side of the intermediate gas separator 105 after the air sequentially passes through the air inlets 10 formed in the 1-1-th sealing gasket 200 (1-1), the first metal support 301, and the 1-2-th sealing gasket 500 (1-2).

As described with reference to the fuel cell stack unit 1000 according to the embodiment of the present invention, at least a portion of the air introduced from the air inlet 10 of the first gas separator 101 may flow along the border between the lower side of the first end cell for a fuel cell and the upper side of the intermediate gas separator 105 through the first flow and may be supplied to the first cathode 431 of the first end cell 401 for a fuel cell.

The air, which has flowed to the opposite side of the first end cell 401 for a fuel cell without being supplied to the first cathode 431 of the first end cell 401 for a fuel cell through the first flow, and the air of a low oxygen concentration, which is left after a reaction in the cathode 431, may be immediately discharged to the outside through the cut-off structure 25 in which at least a portion of the periphery of the 1-2-th sealing gasket 500 (1-2) on the upper side of the intermediate gas separator 105 is recessed inwards.

Further, after the air introduced from the air inlet 10 of the second gas separator 102 reaches the air inlet 10 of the intermediate gas separator 105 after sequentially passing through the air inlets 10 formed in the 1-1-th sealing gasket 500 (2-2), the first metal support 302, and the 1-2-th sealing gasket 500 (1-2), the air, which does not flow from the one side to the opposite side of the first end cell 401 for a fuel cell may pass through the air inlet 10 of the intermediate gas separator 105 and may be included in the second flow.

Further, the first flow may include flows of the air, which has reached the air inlet 10 of the intermediate gas separator 105, from the one side to the opposite side of the second end cell 402 for a fuel cell along a stack border between the lower side of the second end cell 402 for a fuel cell and the upper side of the second gas separator 102 after the air sequentially passes through the air inlets 10 formed in the intermediate gas separator 105, the 2-1-th sealing gasket 200 (105-1), the second metal support 302, and the 2-2-th sealing gasket 500 (2-2).

As described above, the air, which has not been supplied to the first cathode 431 of the first end cell 401 for a fuel cell through the first flow, is introduced from the air inlet 10 of the intermediate gas separator 105, and may flow along the stack border between the lower side of the second end cell 402 for a fuel cell and the upper side of the second gas separator 102 and at least a portion of the air may be supplied to the second cathode 432 of the second end cell 402 for a fuel cell.

The air, which has flowed to the opposite side of the second end cell 402 for a fuel cell without being supplied to the second cathode 432 of the second end cell 402 for a fuel cell through the second flow, and the air of a low oxygen concentration, which is left after a reaction in the cathode 432 of the second end cell 402 for a fuel cell, may be immediately discharged to the outside through the cut-off structure 25 in which at least a portion of the periphery of the 2-2-th sealing gasket 500 (2-2) on the upper side of the second gas separator 102 is recessed inwards.

As described above, because the air, which has flowed to the opposite sides of the first and second end cells 401 and 402 for a fuel cell, is immediately discharged to the outside through the cut-off structure 25, the pressure of the air flowing around the first and second end cells 401 and 402 for a fuel cell may be lower than the pressure of the fuel flowing around the first and second end cells 401 and 402 for a fuel cell.

Accordingly, as described with reference to the fuel cell stack unit 1000 according to the embodiment of the present invention, occurrence of a severe defect in the first and second end cells 401 and 402 for a fuel cell due to the re-oxidation of nickel of the anodes 421 and 431 to nickel oxide can be minimized by preventing the air from leaked to the anodes 421 and 431 through the fuel passage.

Further, because a material (e.g., LSCF) which does not deteriorate characteristics of a battery by maintaining a stable phase even when the fuel is leaked is used in the cathodes 431 and 432 as in the fuel cell stack unit 1000 according to the embodiment of the present invention, deterioration of characteristics of the battery, which appears when the fuel is leaked to the cathodes 431 and 432 in the case in which the pressure of the fuel in the interior of the fuel passage is higher than the pressure of the air in the interior of the air passage can be minimized.

According to an embodiment, at least one of the intermediate gas separator 105, the first and second gas separators 101 and 102, the 1-1-th and 2-1-th sealing gaskets 200 (1-1) and 200 (2-1), and the first and second metal supports 301 and 302 may have the cut-off structure 25 having the same shape as the 1-2-th and 2-2-th sealing gaskets 500 (1-2) and 500 (1-2). For example, all of the intermediate gas separator 105, the first and second gas separators 101 and 102, the 1-1-th and 2-1-th sealing gasket 200 (1-1) and 200 (2-1), and the first and second metal supports 301 and 302 may have the cut-off structure 25. Then, of course, the cut-off structure 25 may have the structure described with reference to FIG. 8 and/or the structure described with reference to FIG. 9.

Hereinafter, an application example of a fuel cell stack for generation of power using a fuel cell stack unit including the fuel cell stack unit according to the embodiment of the present invention.

FIG. 22 is a view illustrating an application example of a fuel cell stack for generation of power including the fuel cell stack unit according to the embodiment of the present invention.

Referring to FIG. 22, the fuel cell stack for generation of power may include a power control device 800 which receives electric power from the fuel cell stack 2000 according to the embodiment of the present invention and transmits the electric power to the outside. The power control device 800 may include an output device 810, a power accumulation device 820, a charging/discharging control device 830, and a system control device 840. The output device 810 may include a power conditioning system 812.

The power conditioning system (PCS) 812 may be an inverter which converts a DC current from the fuel cell stack 2000 to an AC current. The charging/discharging control device 830 may store electric power from the fuel cell stack 2000 in the power accumulation device 820, and may output the electricity stored in the power accumulation device 820 to the output device 810. The system control device 840 may control the output device 810, the power accumulation device 820, and the charging/discharging control device 830.

As described above, the converted AC current may be supplied to and used for various AC loads, such as vehicles or home appliances. Moreover, the output device 810 may further include a grid connection system 814. The grid connection system 814 may transmit electric power to the outside via a connection to another power system 920.

Hereinafter, a fuel cell stack unit according to a second embodiment of the present invention will be described with reference to FIGS. 23 to 31.

FIG. 23 is a view illustrating a first gas separator according to a second embodiment of the present invention, FIG. 24 is a view illustrating a first sealing gasket according to the second embodiment of the present invention, FIG. 25 is a view illustrating a second sealing gasket according to the second embodiment of the present invention, FIG. 26 is a view illustrating a third sealing gasket according to the second embodiment of the present invention, FIG. 27 is a view illustrating a fourth sealing gasket according to the second embodiment of the present invention, FIG. 28 is a view illustrating a second gas separator according to the second embodiment of the present invention, and FIG. 29 is an exploded perspective view illustrating a fuel cell stack unit according to the second embodiment of the present invention. In a description of the fuel cell stack unit according to the second embodiment of the present invention, the prior description of the repeated configuration of the fuel cell stack unit according to the first embodiment will be omitted.

The fuel cell stack unit according to the second embodiment of the present invention may include at least one of a first gas separator 1100, first to fourth sealing gaskets 1200, 1300, 1400, and 1500, a second gas separator 1600.

Referring to FIG. 23, the first gas separator 1100 may include an air inlet 1110 and an air outlet 1120 which provide an air passage. Then, the air inlet 1110 and the air outlet 1120 may allow the air to flow in the thickness direction of the first gas separator 1100.

The first gas separator 1100 may include a fuel inlet 1130 and a fuel outlet 1140 which provide a fuel passage. The fuel inlet 1130 and the fuel outlet 1140 may allow the fuel to flow in the thickness direction of the first gas separator 1100.

A channel 1122 may be provided on one surface of the first gas separator 1100 such that the air provided from the air inlet 1110 flows toward the air outlet 1120. The channel 1122 may include ridges and valleys. Accordingly, the air flowing through the channel 1122 may be provided in the cathode of the end cell disposed on the upper side of the first gas separator 1100.

Although not illustrated in FIG. 23, a channel may be provided on an opposite surface of the first gas separator 1100 such that the fuel provided from the fuel inlet 1130 flows toward the fuel outlet 1140. Then, the channel on the opposite surface of the first gas separator 1100 may be provided in a direction that is perpendicular to the above-described channel 1122. Accordingly, air may be provided to an anode of another end cell disposed on the lower side of the first gas separator 1100 while the fuel flows through the channel.

Referring to FIG. 24, the first sealing gasket 1200 may be stacked on one side, for example, the upper side of the first gas separator 1100. The first sealing gasket 1200, for example, may include mica or vermiculite.

The first sealing gasket 1200 may include an air inlet 1210 which communicates with the air inlet 1110 of the first gas separator 1100 in the stack direction, and an air outlet 1220 which communicates with the air outlet 1120 of the first gas separator 1110 in the stack direction.

Further, the first sealing gasket 1200 may include a fuel inlet 1230 which communicates with the fuel inlet 1130 of the first gas separator 1100 in the stack direction, and a fuel outlet 1240 which communicates with the fuel outlet 1140 of the first gas separator 1100.

An opening may be formed at a center portion of the first sealing gasket 1200. An end cell 1250 may be located in the opening of the first sealing gasket 1200. The opening of the first sealing gasket 1200 may have a shape agreeing with the outer shape of the end cell 1250, for example, a rectangular shape to accommodate the end cell 1250.

A current collecting unit 1710 (see FIG. 30) may be formed on the lower side of the end cell 1250. Then, the current collecting unit 1710 may include a metal mesh, may overlap the end cell 1250, and may have a cross-section that is equal to or greater than that of the end cell 1250. Accordingly, generation of a crack of the end cell by a local stress may be reduced.

The first sealing gasket 1200 may include gas guide channels 1260 and 1270. The gas guide channels 1260 and 1270 may discharge leaked gases, for example, air and/or fuel gases to the outside. According to an embodiment, the gas guide channel 1260 may be provided between the fuel outlet 1240 and the opening of the first sealing gasket 1200, and the gas guide channel 1270 may be provided between the fuel inlet 1230 and the opening of the first sealing gasket 1200.

Referring to FIG. 25, the second sealing gasket 1300 may be stacked on one side, for example, the upper side of the first sealing gasket 1200. The second sealing gasket 1300, for example, may include mica or vermiculite.

The second sealing gasket 1300 may include an air inlet 1310 which communicates with the air inlet 1210 of the first sealing gasket 1200 in the stack direction, and an air outlet 1320 which communicates with the air outlet 1220 of the first sealing gasket 1200 in the stack direction.

Further, the second sealing gasket 1200 may include a fuel inlet 1330 which communicates with the fuel inlet 1230 of the first sealing gasket 1200 in the stack direction, and a fuel outlet 1340 which communicates with the fuel outlet 1240 of the first sealing gasket 1200 in the stack direction.

An opening also may be formed at a center portion of the second sealing gasket 1300. The opening of the second sealing gasket 1300 may have an area that is smaller than that of the opening of the first sealing gasket 1200. Accordingly, the inside of the second sealing gasket 1300 may cover the opening of the first sealing gasket 1200. In another aspect, the inside of the second sealing gasket 1300 may cover a peripheral portion of the end cell 1250 accommodated in the first sealing gasket 1200. In another aspect, the inside of the second sealing gasket 1300 and one side of the end cell 1250 may overlap each other.

A current collecting body 1720 may be provided in an opening at the center of the second sealing gasket 1300.

The second sealing gasket 1300 may include a 2-1-th gas guide channel 1355 which opens the upper side of the end cell 1250. The 2-1-th gas guide channel 1355 may have an opening, which is formed to be spaced apart from the opening of the second sealing gasket 1300. The 2-1-th gas guide channel 1355 may have a form which surrounds a portion of the opening of the second sealing gasket 1300. For example, the 2-1-th guide channel 1355 may have a closed loop shape having a rectangular shape.

The second sealing gasket 1300 may include the 2-1-th gas guide channel 1360 and the 2-2-th gas guide channel 1370. These gas guide channels may discharge leaked gases, for example, air and/or fuel gases to the outside. According to an embodiment, the 2-2-th gas guide channel 1360 is provided between the air inlet 1310 and the left side of the 2-1-th gas guide channel 1355, and the 2-2-th gas guide channel 1370 may be provided between the air outlet 1320 and the right side of the 2-2-th gas guide channel 1355.

According to an embodiment, a structure in which the air inlet 1310, the air outlet 1320, the fuel inlet 1330, the fuel outlet 1340, the central opening, the 2-1-th gas guide channel 1355, and the 2-2-th gas guide channels 1360 and 1370 are made not to communicate each other by spacing them apart from each other may be provided in the second sealing gasket 1300.

Referring to FIG. 26, the third sealing gasket 1400 may be stacked on one side, for example, the upper side of the second sealing gasket 1300. Then, the third sealing gasket 1400 may be formed of a metal.

The third sealing gasket 1400 may include an air inlet 1410 which communicates with the air inlet 1310 of the second sealing gasket 1300 in the stack direction, and an air outlet 1420 which communicates with the air outlet 1320 of the second sealing gasket 1300 in the stack direction.

Further, the third sealing gasket 1400 may include a fuel inlet 1430 which communicates with the fuel inlet 1330 of the second sealing gasket 1300 in the stack direction, and a fuel outlet 1440 which communicates with the fuel outlet 1340 of the second sealing gasket 1300.

An opening also may be formed at a center portion of the third sealing gasket 1400. The opening of the third sealing gasket 1400 may have a size corresponding to the above-described opening of the second sealing gasket 1300. That is, the size of the central opening of the third sealing gasket 1400 may be smaller than that of the central opening of the first sealing gasket 1200. Accordingly, a portion of the inside of the third sealing gasket 1400 may overlap a peripheral portion of the end cell 1250 accommodated in the first sealing gasket 1200.

A current collecting body 1720 may be provided in the central opening of the third sealing gasket 1400. Then, the current collecting body of the third sealing gasket 1400 may be integrally formed with the current collecting body of the second sealing gasket 1300.

The third sealing gasket 1400 may include a 3-1-th gas guide channel 1462 and 1472 which communicate with the 2-1-th gas guide channel 1355 of the second sealing gasket 1300 in the stack direction.

The third sealing gasket 1400 discharges the gas to the outside, and may include 3-3-th gas guide channels 1460 and 1470 which communicates with the 2-2-th gas guide channels 1360 and 1370 in the stack direction.

The third sealing gasket 1400 may include a 3-2-th gas guide channel 1464 which connects the 3-1-th gas guide channel 1462 and the 3-3-th gas guide channel 1460 to a surface of the third sealing gasket 1400. Further, the third sealing gasket 1400 may include a 3-2-th gas guide channel 1474 which connects the 3-1-th gas guide channel 1472 and the 3-3-th gas guide channel 1470 to a surface of the third sealing gasket 1400. Accordingly, the gas may be discharged to the outside along the direction of an arrow through the 3-1-th gas guide channel, the 3-2-th gas guide channel, and the 3-3-th gas guide channel.

Referring to FIG. 27, the fourth sealing gasket 1500 may be stacked on one side, for example, the upper side of the third sealing gasket 1400. The fourth sealing gasket 1500, for example, may include mica or vermiculite.

The fourth sealing gasket 1500 may include an air inlet 1510 which communicates with the air inlet 1410 of the third sealing gasket 1400 in the stack direction, and an air outlet 1520 which communicates with the air outlet 1420 of the third sealing gasket 1400 in the stack direction.

Further, the fourth sealing gasket 1500 may include a fuel inlet 1530 which communicates with the fuel inlet 1430 of the third sealing gasket 1400 in the stack direction, and a fuel outlet 1540 which communicates with the fuel outlet 1440 of the third sealing gasket 1400 in the stack direction.

An opening also may be formed at a center portion of the fourth sealing gasket 1500. The opening of the fourth sealing gasket 1500 may have a size corresponding to the above-described openings of the second sealing gasket 1300 and the third sealing gasket 1400. That is, the size of the central opening of the fourth sealing gasket 1500 may be smaller than that of the central opening of the first sealing gasket 1200. Accordingly, a portion of the inside of the fourth sealing gasket 1500 may overlap a peripheral portion of the end cell 1250 accommodated in the first sealing gasket 1200.

A current collecting body 1720 may be provided in the central opening of the fourth sealing gasket 1500. Then, the current collecting body of the fourth sealing gasket 1500 may be integrally formed with the current collecting body of the second sealing gasket 1300.

The fourth sealing gasket 1500 discharge the gas to the outside, and may include gas guide channels 1560 and 1570 which communicate with the 3-3-th gas guide channels 1460 and 1470 in the stack direction.

Referring to FIG. 28, the second gas separator 1600 may be stacked on one side, for example, the upper side of the fourth sealing gasket 1500.

The second gas separator 1600 may include an air inlet 1610 and an air outlet 1620 which provide an air passage. The second gas separator 1600 may include a fuel inlet 1630 and a fuel outlet 1640 which provide a fuel passage.

Channels 1632 and 1642 may be provided on one surface of the second gas separator 1600 such that the fuel provided from the fuel inlet 1630 flows toward the fuel outlet 1640. The channel 1642 may include ridges and valleys. Accordingly, the fuel flowing through the channels 1632 and 1642 may be provided to the anode of the end cell 1250.

Although not illustrated in FIG. 28, a channel may be provided on an opposite surface of the second gas separator 1600 such that the air provided from the air inlet 1610 flows toward the air outlet 1620. Then, the channel on the opposite surface of the second gas separator 1600 may be provided in a direction that is perpendicular to the above-described channels 1632 and 1642. Accordingly, air may be provided to a cathode of another end cell disposed on the upper side of the second gas separator 1600 while the air flows through the channel.

Referring to FIG. 29, the fuel cell stack unit may be provided by stacking the first gas separator 1100, the first sealing gasket 1200, the second sealing gasket 1300, the third sealing gasket 1400, the fourth sealing gasket 1500, and the second gas separator 1600, which have been described above.

Accordingly, the air introduced from the outside may be introduced through the air inlets. The introduced air may be provided to the cathode of the end cell 1250 through the channel 1122. Further, the fuel introduced from the outside may flow along the fuel inlets, and may be provided to the anode of the end cell 1250 through the channels 1632 and 1642.

Until now, the fuel cell stack unit according to the second embodiment of the present invention has been described with reference to FIGS. 23 to 29. Hereinafter, a gas discharging method of the fuel cell stack unit according to the second embodiment of the present invention will be described.

FIGS. 30 and 31 are views illustrating a gas discharging method of a fuel cell stack unit according to the second embodiment of the present invention. FIG. 30 illustrates a section taken along line A-A' of FIGS. 23 to 28, and illustrates that the first gas separator 1100 and the first to fourth sealing gaskets 1100, 1200, 1300, and 1400 are stacked. FIG. 31 illustrates an enlarged view of area A of FIG. 30.

Referring to FIGS. 30 and 31, the air may be provided to the cathode of the end cell 1250 through the channel 1122 of the first gas separator 1100. Meanwhile, a gas including a fuel and/or air may be leaked in the fuel cell stack unit. If the leaked gas is left alone, a problem of decreasing power generation efficiency may be caused.

However, according to the second embodiment of the present invention, the leaked gas may be immediately discharged to the outside by communicating the 2-1-th gas guide channel 1355, the 3-1-th gas guide channel 1462, the 3-2-th gas guide channel 1464, the 3-3-th gas guide channel 1460, and the 2-2-th gas guide channel 1360 with each other.

In particular, because the 2-1-th gas guide channel 1355 is disposed to overlap the end cell 1250, the leaked gas may be removed in advance before the leaked air proceeds to the anode or the leaked fuel proceeds to the cathode.

Accordingly, the fuel cell stack unit according to the second embodiment of the present invention can prevent a decrease in power generation efficiency caused as the leaked air is supplied to the anode or the leaked fuel is supplied to the cathode.

Further, because the current collecting unit 1710 is configured to have a cross-section that is equal to or greater than that of the end cell 1250, occurrence of a crack in the end cell due to a local stress may be reduced.

Until now, the fuel cell stack unit according to the second embodiment of the present invention has been described. Of course, the fuel cell stack unit according to the second embodiment of the present invention may include a fuel cell stack as described with reference to FIG. 21.

Hereinafter, a fuel cell stack unit according to a third embodiment of the present invention will be described with reference to FIGS. 32 to 39.

FIG. 32 is a view illustrating a cathode of a first gas separator according to a third embodiment of the present invention, FIG. 33 is a view illustrating a first sealing gasket according to the third embodiment of the present invention, FIG. 34 is a view illustrating a second sealing gasket according to the third embodiment of the present invention, FIG. 35 is a view illustrating a third sealing gasket according to the third embodiment of the present invention, FIG. 36 is a view illustrating an anode of the second gas separator according to the third embodiment of the present invention, and FIG. 37 is an exploded perspective view illustrating a fuel cell stack unit according to the third embodiment of the present invention.

The fuel cell stack unit according to the third embodiment of the present invention may include at least one of a first gas separator 2100, first to third sealing gaskets 2200, 2300, and 2400, and a second gas separator 2500. Hereinafter, in a description of the configurations, a description of the repeated parts of the above-description will be omitted.

Referring to FIG. 32, the first gas separator 2100 may be the same as the first gas separator 1100, which has been described above. That is, the first gas separator 2100 may include an air inlet 2110, an air outlet 2120, a fuel inlet 2130, a fuel outlet 2140, and a channel 2122.

Referring to FIG. 33, the first sealing gasket 2200 may be stacked on one side, for example, the upper side of the first gas separator 2100. The first sealing gasket 2200, for example, may include mica or vermiculite.

The first sealing gasket 2200 may include an air inlet 2210 which communicates with the air inlet 2110 of the first gas separator 2100 in the stack direction, and an air outlet 2220 which communicates with the air outlet 2120 of the first gas separator 2110 in the stack direction.

Further, the first sealing gasket 2200 may include a fuel inlet 2230 which communicates with the fuel inlet 2130 of the first gas separator 2100 in the stack direction, and a fuel outlet 2240 which communicates with the fuel outlet 2240 of the first gas separator 2100.

An opening may be formed at a center portion of the first sealing gasket 2200. A current collecting body 2250 may be located in the opening of the first sealing gasket 2200. The opening of the first sealing gasket 2200 may have a shape agreeing with the outer shape of the current collecting body 2250, for example, a rectangular shape to accommodate the current collecting body 2250.

The first sealing gasket 2200 may include gas guide channels 2260 and 2270. The gas guide channels 2260 and 2270 may discharge leaked gases, for example, air gas and/or fuel gases to the outside. According to an embodiment, the gas guide channel 2260 may be provided between the fuel outlet 2240 and the upper side of the current collecting body 2250, and the gas guide channel 2270 may be provided between the fuel inlet 2230 and the lower side of the current collecting body 2250.

Referring to FIG. 34, the second sealing gasket 2300 may be stacked on one side, for example, the upper side of the first sealing gasket 2200. The second sealing gasket 2300, for example, may include metal.

The second sealing gasket 2300 may include an air inlet 2310 which communicates with the air inlet 2210 of the second sealing gasket 2200 in the stack direction, and an air outlet 2320 which communicates with the air outlet 2220 of the first sealing gasket 2200 in the stack direction.

Further, the second sealing gasket 2300 may include a fuel inlet 2330 which communicates with the fuel inlet 2230 of the first sealing gasket 2200 in the stack direction, and a fuel outlet 2340 which communicates with the fuel outlet 2240 of the first sealing gasket 2200 in the stack direction.

An opening also may be formed at a center portion of the second sealing gasket 2300. The opening of the second sealing gasket 2300 may have an area that is smaller than that of the opening of the first sealing gasket 2200.

An end cell 2350 may be accommodated in the central opening of the second sealing gasket 2300. Then, because the opening of the second sealing gasket 2300 is wider than the opening of the first sealing gasket 2200, the end cell 2350 may overlap the first sealing gasket 2200.

The opening of the second sealing gasket 2300 may further include an extension opening 2355 which extends to communicate with the gas guide channels 2260 and 2270 of the first sealing gasket 2200 in the stack direction. Accordingly, when the leaked gas is collected in the extension opening 2355, it can be immediately discharged to the outside through the gas guide channels 2260 and 2270, which communicate with the extension opening 2355.

Referring to FIG. 35, the third sealing gasket 2400 may be stacked on one side, for example, the upper side of the second sealing gasket 2300. The third sealing gasket 2400, for example, may include mica or vermiculite.

The third sealing gasket 2400 may include an air inlet 2410 which communicates with the air inlet 2310 of the second sealing gasket 2300 in the stack direction, and an air outlet 2420 which communicates with the air outlet 2320 of the second sealing gasket 2300 in the stack direction.

Further, the third sealing gasket 2400 may include a fuel inlet 2430 which communicates with the fuel inlet 2330 of the second sealing gasket 2300 in the stack direction, and a fuel outlet 2440 which communicates with the fuel outlet 2340 of the second sealing gasket 2300 in the stack direction.

An opening also may be formed at a center portion of the third sealing gasket 2400. A current collecting body 2450 may be located in the opening of the third sealing gasket 2400. The opening of the third sealing gasket 2400 may have a shape agreeing with the outer shape of the current collecting body 2450, for example, a rectangular shape to accommodate the current collecting body 2450.

According to an embodiment, the size of the central opening of the third sealing gasket 2400 may be smaller than that of the central opening of the second sealing gasket 2300. Accordingly, the current collecting body 2450 of the third sealing gasket 2400 may overlap the end cell 2350 accommodated in the central opening of the second sealing gasket 2300.

Further, the size of the central opening of the third sealing gasket 2400 may be smaller than that of the central opening of the first sealing gasket 2200. Accordingly, the current collecting body 2450 accommodated in the central opening of the third sealing gasket 2400 may be smaller than the current collecting body 2250 accommodated in the central opening of the first sealing gasket 2200.

That is, the order of the sizes of the central openings may be the second sealing gasket 2300, the first sealing gasket 2200, and the third sealing gasket 2400, from the largest one. Unlike this, of course, the order of the sizes of the central openings may be the second sealing gasket 2300, the third sealing gasket 2400, and the first sealing gasket 2200, from the largest one. Hereinafter, for convenience of description, a case in which the order of the size of the central openings is the second sealing gasket 2300, the first sealing gasket 2200, and the third sealing gasket 2400 from the largest one will be assumed.

In this case, the lower side of the end cell 2350 is supported by the inner upper surface of the first sealing gasket 2200 and the upper surface of the current collecting body 2250 of the first sealing gasket 2200, and the upper side of the end cell 2350 is supported by the inner lower surface of the third sealing gasket 2400 and the lower surface of the current collecting body 2450 of the third sealing gasket 2400. Then, the area of the inner lower surface of the third sealing gasket 2400, which supports the end cell 2350, is larger than the area of the inner upper surface of the first sealing gasket 2200, which supports the end cell 2350. Further, the area of the upper surface of the current collecting body 2250 of the first sealing gasket 2200, which supports the end cell 2350, is larger than the area of the lower surface of the current collecting body 2450 of the third sealing gasket 2400, which supports the end cell 2350. That is, the ratio of the area of the third sealing gasket 2400, which supports the upper surface of the end cell 2350, and the area of the current collecting body 2450 provided in the opening of the third sealing gasket 2400 may be different from the ratio of the area of the first sealing gasket 2200, which supports the lower surface of the end cell 2350, and the area of the current collecting body 2250 provided in the opening of the first sealing gasket 2200.

Accordingly, because the sealing gasket and the current collecting body on the upper surface and the lower surface, which support the end cell 2350, are complementarily disposed, a crack can be effectively prevented in the end cell.

Further, because the end cell 2350 overlap the inner sides of the first and third sealing gaskets 2200 and 2400, sealing performance can be further improved.

The third sealing gasket 2400 discharges gases to the outside, and may include second gas guide channels 2460 and 2470. The gas guide channel 2460 may be provided between the air inlet 2410 and the left side of the current collecting body 2450. Further, the gas guide channel 2470 may be provided between the air outlet 2420 and the right side of the current collecting body 2450.

Referring to FIG. 29, the second gas separator 2500 may be the same as the first gas separators 1100 and 2100 and the second gas separator 1600, which have been described above. That is, the second gas separator 2500 may include an air inlet 2510, an air outlet 2520, a fuel inlet 2530, a fuel outlet 2540, and channels 2532 and 2534.

Referring to FIG. 37, the fuel cell stack unit may be provided by stacking the first gas separator 2100, the first sealing gasket 2200, the second sealing gasket 2300, the third sealing gasket 2400, and the second gas separator 2500, which have been described above.

Accordingly, the air introduced from the outside may be introduced through the air inlets. The introduced air may be provided to the cathode of the end cell 2350 through the channel 2122. Further, the fuel introduced from the outside may flow along the fuel inlets, and may be provided to the anode of the end cell 2350 through the channels 2532 and 2542.

Until now, the fuel cell stack unit according to the third embodiment of the present invention has been described with reference to FIGS. 32 to 37. Hereinafter, a gas discharging method of the fuel cell stack unit according to the third embodiment of the present invention will be described.

FIGS. 38 and 39 are views illustrating a gas discharging method of a fuel cell stack unit according to the third embodiment of the present invention, FIG. 38 illustrates a section taken along line A-A' of FIGS. 33 to 35, and illustrates that the first to third sealing gaskets 2200, 2300, and 2400 are stacked. FIG. 39 illustrates an enlarged view of area A of FIG. 38.

Referring to FIGS. 38 and 39, the fuel may be provided to the anode of the end cell 2350 through the channels. Meanwhile, a gas including a fuel and/or air may be leaked in the fuel cell stack unit. For example, the gas may be leaked along the stack border surfaces of the sealing gaskets, and may be leaked after penetrating into the material of the sealing gasket itself. If the leaked gas is left alone, a problem of decreasing power generation efficiency may be caused.

However, according to the third embodiment of the present invention, because the extension opening 2355 and the gas guide channels 2260 and 2270 of the first sealing gasket 2200 communicate each other, the leaked gas can be immediately removed.

As illustrated in FIG. 38, the areas of the upper surface of the current collecting body 2250 and the lower surface of the current collecting body 2450, which support the end cell 2350 with the end cell 2350 being interposed therebetween, may be different. Further, the areas of the inner upper surface of the first sealing gasket 2200 and the inner lower surface of the third sealing gasket 2400, which support the end cell 2350 while the end cell 2350 being interposed therebetween, may be different. Accordingly, the end cell 2350 may be provided with complementary support forces from the upper surface and the lower surface of the end cell 2350. Accordingly, a possibility of generation of a crack in the end cell 2350 can be reduced.

Until now, the fuel cell stack unit according to the third embodiment of the present invention has been described. Of course, the fuel cell stack unit according to the third embodiment of the present invention may include a fuel cell stack as described with reference to FIG. 21.

Hereinafter, a modified example according to a change in a direction of the end cell will be described with referenced to FIG. 40.

FIG. 40 is a view illustrating a modified example related to a direction of an end cell in the fuel cell stack unit according to the embodiment of the present invention. Although the present modified example is applied to the above-mentioned first embodiment for convenience of description, of course, it may be applied to the second and third embodiments as well.

As illustrated in FIG. 40, the end cell 400 may be disposed to be inclined with respect to the metal support 300. That is, the sides of the end cell 400, which are adjacent to the sides of the metal support 300, may be disposed to be inclined. Accordingly, the configurations of the first and second gas separators 101 and 102 and the first and second sealing gaskets 200 and 500 may be disposed to be inclined. In more detail, the air and fuel of the first and second gas separators 101 and 102 may be formed to be inclined with respect to the gas separator. Further, the gas guide channels of the first and second sealing gaskets 200 and 500 may be formed to be inclined with respect to the sealing gasket.

Accordingly, a distance of the gas guide channel and one side of the end cell can be increased. In more detail, the distance between the gas guide channel 570 of the second sealing gasket 500 and a side of the cathode of the end cell 400 can be increased, and similarly, the distance between the gas guide channel 270 of the first sealing gasket 200 and one side of the anode of the end cell 400 can be increased.

Accordingly, an effect of reducing diffusion of the leaked gas from the end cell and the gas guide channel through the sealing gasket can be provided. In the conventional technology, because the distance between the end cell and the gas guide channel is short, the leaked gas filled in the gas guide channel is diffused to the end cell rather than is directly discharged to the outside. However, according to the present modified example, because the distance between the gas guide channel and the end cell is increased, a problem of reversing the leaked gas to the end cell can be solved. Accordingly, a stable open circuit voltage can be provided.

The first to third embodiments of the present invention, which have been described above, can be individually carried out, but of course, a combination of at least two embodiments can be carried out. For example, the first and second embodiments can be combined, the first and third embodiments can be combined, and the second and third embodiments can be combined.

Although the preferred embodiments of the present invention have been described in detail until now, the scope of the present invention is not limited to the embodiments and should be construed by the attached claims. Further, it should be understood that those skilled in the art to which the present invention pertains may variously correct and modify the present invention without departing from the scope of the present invention.

The invention claimed is:

1. A fuel cell stack unit comprising:
   a first sealing gasket in which an end cell is accommodated at a center portion thereof;
   a first gas separator disposed under the first sealing gasket and having a channel which provides an air flow in a direction parallel to a surface of the end cell;
   a second sealing gasket stacked on the first sealing gasket, configured to cover a peripheral portion of the end cell, and having a first gas guide channel which opens an upper side of the end cell;
   a third sealing gasket stacked on an upper side of the second sealing gasket, and including:
      a second gas guide channel which communicates with the first gas guide channel in a stack direction;
      a third gas guide channel which discharges a gas in the second gas guide channel out of the fuel cell stack unit; and
      a fourth gas guide channel which connects the second gas guide channel and the third gas guide channel,
   wherein the second gas guide channel, the third gas guide channel, and the fourth gas guide channel penetrate the third sealing gasket in the stack direction, and extend linearly on the third sealing gasket, and
   wherein the third gas guide channel extends to reach an edge of the third sealing gasket.

2. The fuel cell stack unit of claim 1, wherein the second sealing gasket further includes an opening smaller than the end cell, and
   wherein the first gas guide channel is formed to be spaced apart from the opening.

3. The fuel cell stack unit of claim 2, wherein the first gas guide channel has a closed loop shape which surrounds the opening.

4. The fuel cell stack unit of claim 1, wherein the second sealing gasket further includes a fifth gas guide channel which is spaced apart from the first gas guide channel.

5. The fuel cell stack unit of claim 4, wherein the fifth gas guide channel communicates with the third gas guide channel in the stack direction.

6. A fuel cell stack, in which the fuel cell stack units of claim 1 is successively stacked.

* * * * *